(12) United States Patent
Arakawa et al.

(10) Patent No.: US 12,514,916 B2
(45) Date of Patent: Jan. 6, 2026

(54) PORCINE CIRCOVIRUS TYPE 2 VLP VACCINE

(71) Applicant: MEIJI ANIMAL HEALTH CO., LTD., Kumamoto (JP)

(72) Inventors: Takeshi Arakawa, Okinawa (JP); Yukihiro Tamaki, Okinawa (JP); Kenichi Yamazaki, Kumamoto (JP); Jinya Yamada, Kumamoto (JP); Nozomi Taira, Okinawa (JP); Hirotaka Uefuji, Okinawa (JP); Ikuko Yonamine, Okinawa (JP); Tetsuya Harakuni, Okinawa (JP); Rui Yamaguchi, Okinawa (JP)

(73) Assignee: MEIJI ANIMAL HEALTH CO., LTD., Kumamoto (JP)

( * ) Notice: Subject to any disclaimer, the term of this patent is extended or adjusted under 35 U.S.C. 154(b) by 918 days.

(21) Appl. No.: 17/634,488

(22) PCT Filed: Jun. 23, 2020

(86) PCT No.: PCT/JP2020/024491
§ 371 (c)(1),
(2) Date: Feb. 10, 2022

(87) PCT Pub. No.: WO2021/033420
PCT Pub. Date: Feb. 25, 2021

(65) Prior Publication Data
US 2022/0296697 A1    Sep. 22, 2022

(30) Foreign Application Priority Data
Aug. 20, 2019 (JP) .................................. 2019-150494

(51) Int. Cl.
*A61K 39/12* (2006.01)
*C07K 14/005* (2006.01)
(Continued)

(52) U.S. Cl.
CPC ............ *A61K 39/12* (2013.01); *C07K 14/005* (2013.01); *C07K 14/315* (2013.01); *C07K 19/00* (2013.01);
(Continued)

(58) Field of Classification Search
None
See application file for complete search history.

(56) References Cited

U.S. PATENT DOCUMENTS 9,657,063 B2    5/2017   Kuo et al.
2003/0017168 A1*  1/2003   Wick ................... A61K 39/385
                                                  424/185.1
(Continued)

FOREIGN PATENT DOCUMENTS

CN        102827289 A     12/2012
CN        102827289 B      4/2014
(Continued)

OTHER PUBLICATIONS

Gleitner et al. (Protein Science. 2001; 10: 434-444).*
(Continued)

*Primary Examiner* — Shanon A. Foley
(74) *Attorney, Agent, or Firm* — Casimir Jones, S.C.; Robert A. Goetz

(57) ABSTRACT

Provided is PCV2 VLP that can be used as a vaccine for use in the field of animal husbandry and that has high molecular stability against physicochemical load. A fusion protein according to the present invention includes a capsid protein of porcine circovirus type 2 and an immunoglobulin-binding domain.

8 Claims, 6 Drawing Sheets
Specification includes a Sequence Listing.

(51) Int. Cl.
- *C07K 14/315* (2006.01)
- *C07K 19/00* (2006.01)
- *C12N 15/62* (2006.01)
- *C12P 21/02* (2006.01)

(52) U.S. Cl.
CPC .............. *C12N 15/62* (2013.01); *C12P 21/02* (2013.01); *C12N 2750/10022* (2013.01); *C12N 2750/10023* (2013.01); *C12N 2750/10034* (2013.01)

(56) References Cited

U.S. PATENT DOCUMENTS

| | | | |
|---|---|---|---|
| 2011/0020394 A1* | 1/2011 | Vaughn | A61P 37/00 435/69.3 |
| 2019/0078101 A1 | 3/2019 | Lin et al. | |
| 2019/0091320 A1 | 3/2019 | Meng et al. | |
| 2022/0296697 A1* | 9/2022 | Arakawa | C07K 14/315 |

FOREIGN PATENT DOCUMENTS

| | | |
|---|---|---|
| JP | 2008-526212 | 7/2008 |
| JP | 2019-504047 | 2/2019 |
| JP | 2019-507784 | 3/2019 |
| WO | WO2006-072065 | 7/2006 |

OTHER PUBLICATIONS

Figure 1:
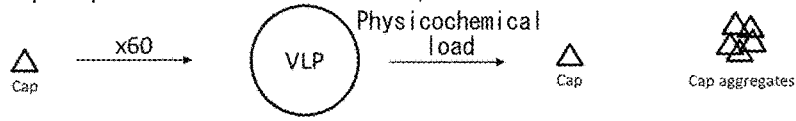
Figure 1:
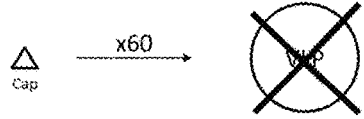
Figure 1:
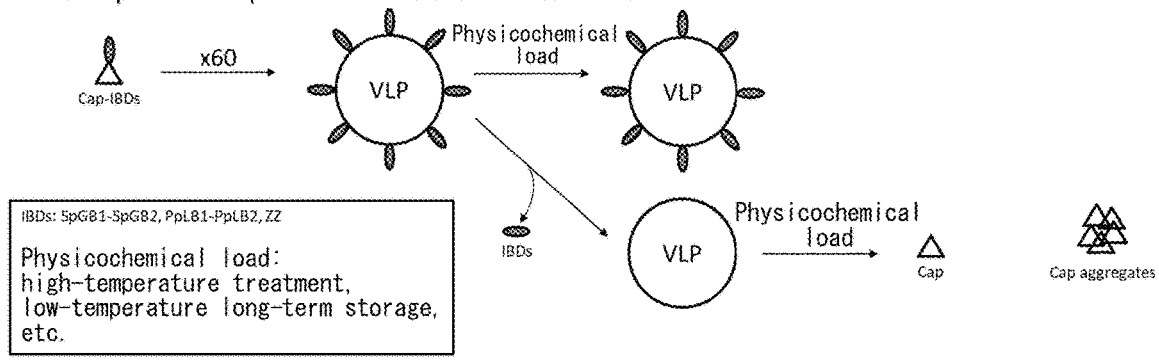

Larsson et al. (Protein Expression and Purification. Jun. 1, 1996; 7 (4):447-457).*
Sidorin et al. (Biochemistry (Moscow), 2011; 76 (3): 295-308).*
Okamoto et al. (Biochemical and Biophysical Research Communications. 2008; 377: 1128-1134).*
Park (BioChip Feb. 2019; 13 (1): 82-94).*
Gronenborn et al. (Immunomethods. 1993; 2: 3-8).*
Khayat R. et al., J. Virol. 2011, 85, 7856-7862.
Harding J.C.S. et al., Swine Health Prod. 1997, 5, 201-203.
Ellis J. et al., Can. Vet. J. 1998, 39, 44-51.
Liu L.-J. et al., Arch. Virol. 2008, 153, 2291-2295.
Tu Y. et al., Appl. Microbiol. Biotechnol. 2013, 97, 2867-2875.
Zaveckas M. et al., J. Chromatogr. B 2015, 991, 21-28.
Marcekova Z. et al., J. Virol. Methods 2009, 162, 133-141.
Liu Q. et al., Protein Expr. Purif. 2001, 21, 115-120.
Yin S. et al., Virol. J. 2010, 7, 166.
Wu PC et al., Appl. Microbiol. Biotechnol. 2012, 95, 1501-1507.
Wu PC et al., J. Biotechnol. 2016, 220, 78-85.
Zhang Y. et al., Arch. Virol. 2016, 161, 1485-1491.
Xi X. et al., J. Biotechnol. 2016, 223, 8-12.
Wang N. et al., J. Virol. Methods 2017, 243, 146-150.
Burroughs A.M. et al., Biol. Direct 2007, 2, 18.
Miyata T. et al., Infect. Immun. 2011, 79, 4260-4275.
Bjorn N. et al., Protein Eng. 1987, 1, 107-113.
Kim, Hyun Jin et al., Adjuvant Effect of B Domain of Staphyloccocal . . . Sep. 4, 2015, vol. 113, No. 2, pp. 268-274, Abstract.
Li, Yangyang et al., Generation and immunogenicity . . . Jun. 9, 2020, vol. 17, No. 72, pp. 1-9, p. 2, Left column, Lines 39-54, Fig. 1B.
International Search Report for PCT/JP2020/024491 and its English translation; mailed Aug. 11, 2020; 6 pages.
Written Opinion for PCT/JP2020/024491 and its English translation; mailed Aug. 11, 2020; 6 pages.
Extended European Search Report for EP 20855547.4. Aug. 28, 2023. 10 pages.
Zhou et al., "Development of Studies on IgG Binding Domain", Pharmaceutical Biotechnology, 2012,19(3) pp. 274-277.
Office Action for CN Application No. 202080058715.6, dated Sep. 27, 2023, 10 pages.

* cited by examiner

FIG. 3
| Cap (233 amino acid residues) | L | SUMO | |
| Cap (233 amino acid residues) | L | SpGB1 domain | SpGB2 domain |
| Cap (233 amino acid residues) | L | PpLB1 domain | PpLB2 domain |
| Cap (233 amino acid residues) | L | Z domain | Z domain |
L: Linker
FIG. 4
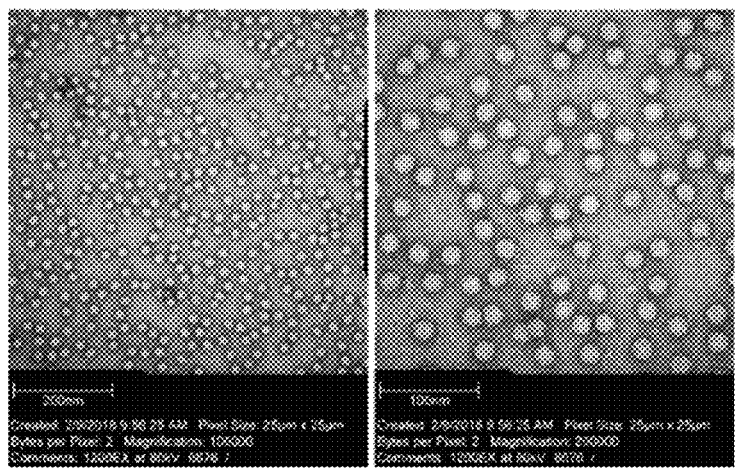
FIG. 5
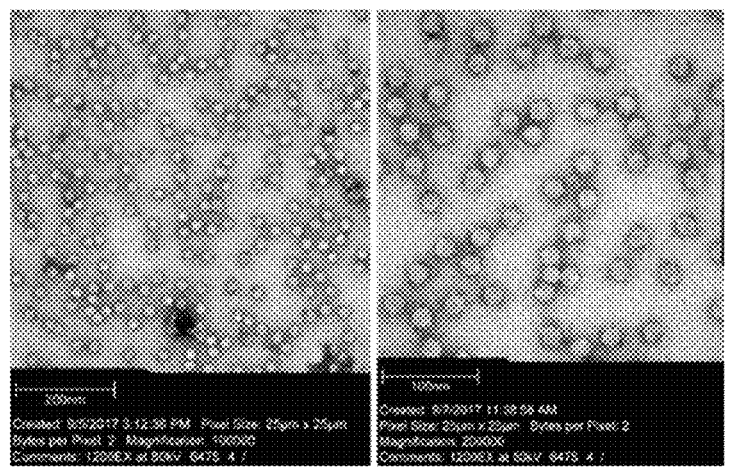

*: Below the limit of quantitation

SEQUENCE LISTING

<160> NUMBER OF SEQ ID NOS: 41

<210> SEQ ID NO 1
<211> LENGTH: 233
<212> TYPE: PRT
<213> ORGANISM: Porcine circovirus 2
<220> FEATURE:
<223> OTHER INFORMATION: Cap

<400> SEQUENCE: 1

Met Thr Tyr Pro Arg Arg Arg Tyr Arg Arg Arg Arg His Arg Pro Arg
1 5 10 15

Ser His Leu Gly Gln Ile Leu Arg Arg Arg Pro Trp Leu Val His Pro
20 25 30

Arg His Arg Tyr Arg Trp Arg Arg Lys Asn Gly Ile Phe Asn Thr Arg
35 40 45

Leu Ser Arg Thr Phe Gly Tyr Thr Ile Lys Arg Thr Thr Val Arg Thr
50 55 60

Pro Ser Trp Ala Val Asp Met Met Arg Phe Asn Ile Asn Asp Phe Leu
65 70 75 80

Pro Pro Gly Gly Gly Ser Asn Pro Arg Ser Val Pro Phe Glu Tyr Tyr
85 90 95

Arg Ile Arg Lys Val Lys Val Glu Phe Trp Pro Cys Ser Pro Ile Thr
            100                 105                 110

Gln Gly Asp Arg Gly Val Gly Ser Ser Ala Val Ile Leu Asp Asp Asn
        115                 120                 125

Phe Val Thr Lys Ala Thr Ala Leu Thr Tyr Asp Pro Tyr Val Asn Tyr
    130                 135                 140

Ser Ser Arg His Thr Ile Thr Gln Pro Phe Ser Tyr His Ser Arg Tyr
145                 150                 155                 160

Phe Thr Pro Lys Pro Val Leu Asp Ser Thr Ile Asp Tyr Phe Gln Pro
                165                 170                 175

Asn Asn Lys Arg Asn Gln Leu Trp Leu Arg Leu Gln Thr Ala Gly Asn
            180                 185                 190

Val Asp His Val Gly Leu Gly Thr Ala Phe Glu Asn Ser Ile Tyr Asp
        195                 200                 205

Gln Glu Tyr Asn Ile Arg Val Thr Met Tyr Val Gln Phe Arg Glu Phe
    210                 215                 220

Asn Leu Lys Asp Pro Pro Leu Asn Pro
225                 230

<210> SEQ ID NO 2
<211> LENGTH: 699
<212> TYPE: DNA
<213> ORGANISM: Porcine circovirus 2
<220> FEATURE:
<223> OTHER INFORMATION: Cap

<400> SEQUENCE: 2

```
atgacctatc

Ala Asn Asp Asn Gly Val Asp Gly Glu Trp Thr Tyr Asp Asp Ala Thr
        35                  40                  45

Lys Thr Phe Thr Val Thr Glu
    50                  55

<210> SEQ ID NO 4
<211> LENGTH: 165
<212> TYPE: DNA
<213> ORGANISM: Artificial Sequence
<220> FEATURE:
<223> OTHER INFORMATION: SpGB1

<400> SEQUENCE: 4
acctataaac tgatcctgaa cggcaaaacc ctgaaaggcg aaaccaccac cgaagccgtg    60
gatgcggcga ccgcggaaaa agtgtttaaa cagtatgcga cgataatgg cgtggatggc   120 gaatggacct atgatgatgc gaccaaaacc tttaccgtga ccgaa                  165

<210> SEQ ID NO 5
<211> LENGTH: 55
<212> TYPE: PRT
<213> ORGANISM: Artificial Sequence
<220> FEATURE:
<223> OTHER INFORMATION: SpGB2

<400> SEQUENCE: 5

Thr Tyr Lys Leu Val Ile Asn Gly Lys Thr Leu Lys Gly Glu Thr Thr
1               5                   10                  15

Thr Glu Ala Val Asp Ala Ala Thr Ala Glu Lys Val Phe Lys Gln Tyr
            20                  25                  30

Ala Asn Asp Asn Gly Val Asp Gly Glu Trp Thr Tyr Asp Asp Ala Thr
        35                  40                  45

Lys Thr Phe Thr Val Thr Glu
    50                  55

<210> SEQ ID NO 6
<211> LENGTH: 165
<212> TYPE: DNA
<213> ORGANISM: Artificial Sequence
<220> FEATURE:
<223> OTHER INFORMATION: SpGB2

<400> SEQUENCE: 6
acctataaac tggtgattaa tggcaaaacc ctgaaaggcg aaaccaccac cgaagcggtg    60
gatgccgcga ccgccgaaaa agtgtttaaa cagtatgcca cgataatgg cgtgacggc    120 gaatggacct atgatgatgc gacgaaaacc tttacggtga cggag                  165

<210> SEQ ID NO 7
<211> LENGTH: 61
<212> TYPE: PRT
<213> ORGANISM: Artificial Sequence
<220> FEATURE:
<223> OTHER INFORMATION: PpLB1

<400> SEQUENCE: 7

Val Thr Ile Lys Ala Asn Leu Ile Phe Ala Asn Gly Ser Thr Gln Thr
1               5                   10                  15

Ala Glu Phe Lys Gly Thr Phe Glu Lys Ala Thr Ser Glu Ala Tyr Ala
            20                  25                  30

Tyr Ala Asp Thr Leu Lys Lys Asp Asn Gly Glu Tyr Thr Val Asp Val
        35                  40                  45

```
Ala Asp Lys Gly Tyr Thr Leu Asn Ile Lys Phe Ala Gly
 50                  55                  60
```

```
<210> SEQ ID NO 8
<211> LENGTH: 183
<212> TYPE: DNA
<213> ORGANISM: Artificial Sequence
<220> FEATURE:
<223> OTHER INFORMATION: PpLB1

<400> SEQUENCE: 8
gtgaccatta aagcgaatct gatctttgcc aacggcagca cccagaccgc ggaatttaaa     60
ggcacctttg aaaaagccac ctcggaagcg tatgcctatg cggataccct gaagaaagat    120
aatggcgaat ataccgtgga tgtggcggat aaaggctata ccctgaacat taaatttgcc    180
ggc                                                                  183
```

```
<210> SEQ ID NO 9
<211> LENGTH: 61
<212> TYPE: PRT
<213> ORGANISM: Artificial Sequence
<220> FEATURE:
<223> OTHER INFORMATION: PpLB2

<400> SEQUENCE: 9

Val Thr Ile Lys Ala Asn Leu Ile Tyr Ala Asp Gly Lys Thr Gln Thr
 1               5                  10                  15

Ala Glu Phe Lys Gly Thr Phe Glu Glu Ala Thr Ala Glu Ala Tyr Arg
             20                  25                  30

Tyr Ala Asp Ala Leu Lys Lys Asp Asn Gly Glu Tyr Thr Val Asp Val
         35                  40                  45

Ala Asp Lys Gly Tyr Thr Leu Asn Ile Lys Phe Ala Gly
 50                  55                  60
```

```
<210> SEQ ID NO 10
<211> LENGTH: 183
<212> TYPE: DNA
<213> ORGANISM: Artificial Sequence
<220> FEATURE:
<223> OTHER INFORMATION: PpLB2

<400> SEQUENCE: 10
gtgacgatca aagcgaatct gatctatgcc gatggcaaaa cgcaaacggc agagttcaaa     60
ggcacctttg aagaagccac cgcggaagcc tatcgctatg cggatgccct gaagaaagat    120
aacggtgaat atacggtgga cgtggcggac aaaggctata cgctgaacat caaattcgca    180
ggc                                                                  183
```

```
<210> SEQ ID NO 11
<211> LENGTH: 58
<212> TYPE: PRT
<213> ORGANISM: Artificial Sequence
<220> FEATURE:
<223> OTHER INFORMATION: Z

<400> SEQUENCE: 11

Val Asp Asn Lys Phe Asn Lys Glu Gln Gln Asn Ala Phe Tyr Glu Ile
 1               5                  10                  15

Leu His Leu Pro Asn Leu Asn Glu Glu Gln Arg Asn Ala Phe Ile Gln
             20                  25                  30
```

Ser Leu Lys Asp Asp Pro Ser Gln Ser Ala Asn Leu Leu Ala Glu Ala
         35                  40                  45

Lys Lys Leu Asn Asp Ala Gln Ala Pro Lys
 50                  55

<210> SEQ ID NO 12
<211> LENGTH: 174
<212> TYPE: DNA
<213> ORGANISM: Artificial Sequence
<220> FEATURE:
<223> OTHER INFORMATION: Z

<400> SEQUENCE: 12
gtggataaca aattcaacaa agaacagcag aacgcgtttt atgaaatctt gcacttacct      60
aatctgaacg aagaacagcg caatgcgttt attcagtcgc tcaaagatga tccgagccag     120
tcggccaatt tgttagcgga agccaaaaaa ttgaacgatg cgcaggcccc gaaa          174

<210> SEQ ID NO 13
<211> LENGTH: 125
<212> TYPE: PRT
<213> ORGANISM: Artificial Sequence
<220> FEATURE:
<223> OTHER INFORMATION: SpGB1-B2

<400> SEQUENCE: 13

Thr Tyr Lys Leu Ile Leu Asn Gly Lys Thr Leu Lys Gly Glu Thr Thr
  1               5                  10                  15

Thr Glu Ala Val Asp Ala Ala Thr Ala Glu Lys Val Phe Lys Gln Tyr
             20                  25                  30

Ala Asn Asp Asn Gly Val Asp Gly Glu Trp Thr Tyr Asp Asp Ala Thr
         35                  40                  45

Lys Thr Phe Thr Val Thr Glu Lys Pro Glu Val Ile Asp Ala Ser Glu
 50                  55                  60

Leu Thr Pro Ala Val Thr Thr Tyr Lys Leu Val Ile Asn Gly Lys Thr
 65                  70                  75                  80

Leu Lys Gly Glu Thr Thr Thr Glu Ala Val Asp Ala Ala Thr Ala Glu
             85                  90                  95

Lys Val Phe Lys Gln Tyr Ala Asn Asp Asn Gly Val Asp Gly Glu Trp
            100                 105                 110

Thr Tyr Asp Asp Ala Thr Lys Thr Phe Thr Val Thr Glu
            115                 120                 125

<210> SEQ ID NO 14
<211> LENGTH: 375
<212> TYPE: DNA
<213> ORGANISM: Artificial Sequence
<220> FEATURE:
<223> OTHER INFORMATION: SpGB1-B2

<400> SEQUENCE: 14
acctataaac tgatcctgaa cggcaaaacc ctgaaaggcg aaaccaccac cgaagccgtg      60
gatgcggcga ccgcggaaaa agtgtttaaa cagtatgcga acgataatgg cgtggatggc     120
gaatggacct atgatgatgc gaccaaaacc tttaccgtga ccgaaaaacc ggaagtgatt     180
gatgcgtcgg aactgacccc ggcggtgacc acctataaac tggtgattaa tggcaaaacc     240
ctgaaaggcg aaaccaccac cgaagcggtg gatgccgcga ccgccgaaaa agtgtttaaa     300
cagtatgcca acgataatgg cgtggacggc gaatggacct atgatgatgc gacgaaaacc     360
tttacggtga cggag                                                    375

<210> SEQ ID NO 15
<211> LENGTH: 133
<212> TYPE: PRT
<213> ORGANISM: Artificial Sequence
<220> FEATURE:
<223> OTHER INFORMATION: PpLB1-B2

<400> SEQUENCE: 15

Val Thr Ile Lys Ala Asn Leu Ile Phe Ala Asn Gly Ser Thr Gln Thr
1               5                   10                  15

Ala Glu Phe Lys Gly Thr Phe Glu Lys Ala Thr Ser Glu Ala Tyr Ala
            20                  25                  30

Tyr Ala Asp Thr Leu Lys Lys Asp Asn Gly Glu Tyr Thr Val Asp Val
        35                  40                  45

Ala Asp Lys Gly Tyr Thr Leu Asn Ile Lys Phe Ala Gly Lys Glu Lys
    50                  55                  60

Thr Pro Glu Glu Pro Lys Glu Glu Val Thr Ile Lys Ala Asn Leu Ile
65                  70                  75                  80

Tyr Ala Asp Gly Lys Thr Gln Thr Ala Glu Phe Lys Gly Thr Phe Glu
                85                  90                  95

Glu Ala Thr Ala Glu Ala Tyr Arg Tyr Ala Asp Ala Leu Lys Lys Asp
            100                 105                 110

Asn Gly Glu Tyr Thr Val Asp Val Ala Asp Lys Gly Tyr Thr Leu Asn
        115                 120                 125

Ile Lys Phe Ala Gly
    130

<210> SEQ ID NO 16
<211> LENGTH: 399
<212> TYPE: DNA
<213> ORGANISM: Artificial Sequence
<220> FEATURE:
<223> OTHER INFORMATION: PpLB1-B2

<400> SEQUENCE: 16
gtgaccatta aagcgaatct gatctttgcc aacggcagca cccagaccgc ggaatttaaa      60
ggcacctttg aaaagccac ctcggaagcg tatgcctatg cggatacct gaagaaagat      120 aatggcgaat ataccgtgga tgtggcggat aaaggctata ccctgaacat taaatttgcc      180
ggcaaagaaa aaaccccgga agaaccgaaa gaagaagtga cgatcaaagc gaatctgatc      240
tatgccgatg gcaaaacgca aacggcagag ttcaaaggcc cctttgaaga agccaccgcg      300
gaagcctatc gctatgcgga tgcctgaag aaagataacg gtgaatatac ggtggacgtg      360
gcggacaaag gctatacgct gaacatcaaa ttcgcaggc                           399

<210> SEQ ID NO 17
<211> LENGTH: 116
<212> TYPE: PRT
<213> ORGANISM: Artificial Sequence
<220> FEATURE:
<223> OTHER INFORMATION: ZZ

<400> SEQUENCE: 17

Val Asp Asn Lys Phe Asn Lys Glu Gln Gln Asn Ala Phe Tyr Glu Ile
1               5                   10                  15

Leu His Leu Pro Asn Leu Asn Glu Glu Gln Arg Asn Ala Phe Ile Gln
            20                  25                  30

Ser Leu Lys Asp Asp Pro Ser Gln Ser Ala Asn Leu Leu Ala Glu Ala
          35                  40                  45

Lys Lys Leu Asn Asp Ala Gln Ala Pro Lys Val Asp Asn Lys Phe Asn
 50                  55                  60

Lys Glu Gln Gln Asn Ala Phe Tyr Glu Ile Leu His Leu Pro Asn Leu
 65                  70                  75                  80

Asn Glu Glu Gln Arg Asn Ala Phe Ile Gln Ser Leu Lys Asp Asp Pro
                 85                  90                  95

Ser Gln Ser Ala Asn Leu Leu Ala Glu Ala Lys Lys Leu Asn Asp Ala
            100                 105                 110

Gln Ala Pro Lys
        115

<210> SEQ ID NO 18
<211> LENGTH: 348
<212> TYPE: DNA
<213> ORGANISM: Artificial Sequence
<220> FEATURE:
<223> OTHER INFORMATION: ZZ

<400> SEQUENCE: 18
gtggataaca aattcaacaa agaacagcag aacgcgttct atgaaatctt gcatttacca      60
aacctgaacg aagaacagcg caacgcgttt attcagtcgc tcaaagatga tcctagccag     120
tcggccaatt tgttagcgga agccaaaaaa ctgaacgatg cgcaggcccc gaaagttgac     180
aataaattta ataaagagca gcagaacgcg ttttatgaaa tccttcacct gccgaatttg     240
aacgaagaac agcggaatgc ctttattcag agcttaaaag atgatccatc tcaatcggcg     300
aacctgctgg cggaggcgaa aaaactcaat gatgcccaag ccccaaaa                  348

<210> SEQ ID NO 19
<211> LENGTH: 4
<212> TYPE: PRT
<213> ORGANISM: Artificial Sequence
<220> FEATURE:
<223> OTHER INFORMATION: Linker

<400> SEQUENCE: 19

Gly Pro Gly Pro
1

<210> SEQ ID NO 20
<211> LENGTH: 15
<212> TYPE: PRT
<213> ORGANISM: Artificial Sequence
<220> FEATURE:
<223> OTHER INFORMATION: Linker

<400> SEQUENCE: 20

Gly Gly Gly Gly Ser Gly Gly Gly Gly Ser Gly Gly Gly Gly Ser
1               5                   10                  15

<210> SEQ ID NO 21
<211> LENGTH: 16
<212> TYPE: PRT
<213> ORGANISM: Artificial Sequence
<220> FEATURE:
<223> OTHER INFORMATION: Linker

<400> SEQUENCE: 21

Gly Pro Gly Pro Gly Leu Val Pro Arg Gly Ser Gly Pro Gly Pro Gly
1               5                   10                  15

```
<210> SEQ ID NO 22
<211> LENGTH: 12
<212> TYPE: PRT
<213> ORGANISM: Artificial Sequence
<220> FEATURE:
<223> OTHER INFORMATION: Linker

<400> SEQUENCE: 22

Gly Pro Gly Pro Gly Gly Ser Gly Pro Gly Pro Gly
1               5                   10

<210> SEQ ID NO 23
<211> LENGTH: 374
<212> TYPE: PRT
<213> ORGANISM: Artificial Sequence
<220> FEATURE:
<223> OTHER INFORMATION: Cap-SpGB1-B2

<400> SEQUENCE: 23

Met Thr Tyr Pro Arg Arg Tyr Arg Arg Arg His Arg Pro Arg
1               5                   10                  15

Ser His Leu Gly Gln Ile Leu Arg Arg Pro Trp Leu Val His Pro
                20                  25                  30

Arg His Arg Tyr Arg Trp Arg Lys Asn Gly Ile Phe Asn Thr Arg
        35                  40                  45

Leu Ser Arg Thr Phe Gly Tyr Thr Ile Lys Arg Thr Thr Val Arg Thr
    50                  55                  60

Pro Ser Trp Ala Val Asp Met Met Arg Phe Asn Ile Asn Asp Phe Leu
65                  70                  75                  80

Pro Pro Gly Gly Gly Ser Asn Pro Arg Ser Val Pro Phe Glu Tyr Tyr
                85                  90                  95

Arg Ile Arg Lys Val Lys Val Glu Phe Trp Pro Cys Ser Pro Ile Thr
                100                 105                 110

Gln Gly Asp Arg Gly Val Gly Ser Ser Ala Val Ile Leu Asp Asp Asn
            115                 120                 125

Phe Val Thr Lys Ala Thr Ala Leu Thr Tyr Asp Pro Tyr Val Asn Tyr
    130                 135                 140

Ser Ser Arg His Thr Ile Thr Gln Pro Phe Ser Tyr His Ser Arg Tyr
145                 150                 155                 160

Phe Thr Pro Lys Pro Val Leu Asp Ser Thr Ile Asp Tyr Phe Gln Pro
                165                 170                 175

Asn Asn Lys Arg Asn Gln Leu Trp Leu Arg Leu Gln Thr Ala Gly Asn
            180                 185                 190

Val Asp His Val Gly Leu Gly Thr Ala Phe Glu Asn Ser Ile Tyr Asp
    195                 200                 205

Gln Glu Tyr Asn Ile Arg Val Thr Met Tyr Val Gln Phe Arg Glu Phe
    210                 215                 220

Asn Leu Lys Asp Pro Pro Leu Asn Pro Gly Pro Gly Pro Gly Leu Val
225                 230                 235                 240

Pro Arg Gly Ser Gly Pro Gly Thr Tyr Lys Leu Ile Leu Asn
                245                 250                 255

Gly Lys Thr Leu Lys Gly Glu Thr Thr Thr Glu Ala Val Asp Ala Ala
            260                 265                 270

Thr Ala Glu Lys Val Phe Lys Gln Tyr Ala Asn Asp Asn Gly Val Asp
        275                 280                 285

Gly Glu Trp Thr Tyr Asp Asp Ala Thr Lys Thr Phe Thr Val Thr Glu
    290                 295                 300
```

Lys Pro Glu Val Ile Asp Ala Ser Glu Leu Thr Pro Ala Val Thr Thr
305                 310                 315                 320

Tyr Lys Leu Val Ile Asn Gly Lys Thr Leu Lys Gly Glu Thr Thr Thr
            325                 330                 335

Glu Ala Val Asp Ala Ala Thr Ala Glu Lys Val Phe Lys Gln Tyr Ala
                340                 345                 350

Asn Asp Asn Gly Val Asp Gly Glu Trp Thr Tyr Asp Asp Ala Thr Lys
            355                 360                 365

Thr Phe Thr Val Thr Glu
            370

<210> SEQ ID NO 24
<211> LENGTH: 1122
<212> TYPE: DNA
<213> ORGANISM: Artificial Sequence
<220> FEATURE:
<223> OTHER INFORMATION: Cap-SpGB1-B2

<400> SEQUENCE: 24

```
atgacctatc cgcgtcgccg ttatcgtcgc cgccgtcatc gtccgcgttc tcacctgggt     60
caaatcctgc gtcgtcgccc gtggctggtt catccgcgcc atcgttatcg ctggcgtcgc    120
aaaaatggca tctttaatac ccgtctgtcg cgcacctttg gctataccat caaacgcacc    180
accgtgcgta ccccgagctg gcggtggat atgatgcgct ttaatatcaa cgattttctg    240
ccgccgggcg gcggctcgaa tccgcgcagc gtgccgtttg aatattatcg tatccgcaaa    300
gtgaaagtgg aattttggcc gtgctcgccg attacccagg gcgatcgcgg cgtgggcagc    360
tcggcggtga ttctggatga taattttgtg accaaagcga ccgccctgac ctatgatccg    420
tatgtgaact atagctcgcg tcataccatt cccagccgt tttcgtatca tagccgctat    480
tttaccccga accggtgctg ggatagcacc attgattatt tcagccgaa caataaacgc    540
aatcagctgt ggctgcgcct gcagaccgcg ggcaatgtgg atcatgtggg cctgggcacc    600
gcgtttgaaa acagcatcta tgatcaggaa tataacattc gcgtgaccat gtatgtgcag    660
tttcgcgaat taatctgaa agatccgccg ctgaatccgg gcccgggccc gggcctggtg    720
ccgcgtggct cgggcccggg cccgggcacc tataaactga tcctgaacgg caaaaccctg    780
aaaggcgaaa ccaccaccga agccgtggat gcggcgaccg cggaaaaagt gtttaaacag    840
tatgcgaacg ataatggcgt ggatggcgaa tggacctatg atgatgcgac caaaaccttt    900
accgtgaccg aaaaaccgga agtgattgat gcgtcggaac tgaccccggc ggtgaccacc    960
tataaactgg tgattaatgg caaaaccctg aaaggcgaaa ccaccaccga agcggtggat   1020
gccgcgaccg ccgaaaaagt gtttaaacag tatgccaacg ataatggcgt ggacggcgaa   1080
tggacctatg atgatgcgac gaaaaccttt acggtgacgg ag                     1122
```

<210> SEQ ID NO 25
<211> LENGTH: 382
<212> TYPE: PRT
<213> ORGANISM: Artificial Sequence
<220> FEATURE:
<223> OTHER INFORMATION: Cap-PpLB1-B2

<400> SEQUENCE: 25

Met Thr Tyr Pro Arg Arg Arg Tyr Arg Arg Arg His Arg Pro Arg
1               5                   10                  15

Ser His Leu Gly Gln Ile Leu Arg Arg Arg Pro Trp Leu Val His Pro
            20                  25                  30

Arg His Arg Tyr Arg Trp Arg Lys Asn Gly Ile Phe Asn Thr Arg
             35                  40                  45

Leu Ser Arg Thr Phe Gly Tyr Thr Ile Lys Arg Thr Val Arg Thr
 50                  55                  60

Pro Ser Trp Ala Val Asp Met Met Arg Phe Asn Ile Asn Asp Phe Leu
 65                      70                  75                  80

Pro Pro Gly Gly Gly Ser Asn Pro Arg Ser Val Pro Phe Glu Tyr Tyr
                 85                  90                  95

Arg Ile Arg Lys Val Lys Val Glu Phe Trp Pro Cys Ser Pro Ile Thr
                100                 105                 110

Gln Gly Asp Arg Gly Val Gly Ser Ser Ala Val Ile Leu Asp Asp Asn
            115                 120                 125

Phe Val Thr Lys Ala Thr Ala Leu Thr Tyr Asp Pro Tyr Val Asn Tyr
    130                 135                 140

Ser Ser Arg His Thr Ile Thr Gln Pro Phe Ser Tyr His Ser Arg Tyr
145                 150                 155                 160

Phe Thr Pro Lys Pro Val Leu Asp Ser Thr Ile Asp Tyr Phe Gln Pro
                165                 170                 175

Asn Asn Lys Arg Asn Gln Leu Trp Leu Arg Leu Gln Thr Ala Gly Asn
            180                 185                 190

Val Asp His Val Gly Leu Gly Thr Ala Phe Glu Asn Ser Ile Tyr Asp
        195                 200                 205

Gln Glu Tyr Asn Ile Arg Val Thr Met Tyr Val Gln Phe Arg Glu Phe
    210                 215                 220

Asn Leu Lys Asp Pro Pro Leu Asn Pro Gly Pro Gly Pro Gly Leu Val
225                 230                 235                 240

Pro Arg Gly Ser Gly Pro Gly Pro Gly Val Thr Ile Lys Ala Asn Leu
                245                 250                 255

Ile Phe Ala Asn Gly Ser Thr Gln Thr Ala Glu Phe Lys Gly Thr Phe
            260                 265                 270

Glu Lys Ala Thr Ser Glu Ala Tyr Ala Tyr Ala Asp Thr Leu Lys Lys
        275                 280                 285

Asp Asn Gly Glu Tyr Thr Val Asp Val Ala Asp Lys Gly Tyr Thr Leu
    290                 295                 300

Asn Ile Lys Phe Ala Gly Lys Glu Lys Thr Pro Glu Glu Pro Lys Glu
305                 310                 315                 320

Glu Val Thr Ile Lys Ala Asn Leu Ile Tyr Ala Asp Gly Lys Thr Gln
                325                 330                 335

Thr Ala Glu Phe Lys Gly Thr Phe Glu Glu Ala Thr Ala Glu Ala Tyr
            340                 345                 350

Arg Tyr Ala Asp Ala Leu Lys Lys Asp Asn Gly Glu Tyr Thr Val Asp
        355                 360                 365

Val Ala Asp Lys Gly Tyr Thr Leu Asn Ile Lys Phe Ala Gly
    370                 375                 380

<210> SEQ ID NO 26
<211> LENGTH: 1146
<212> TYPE: DNA
<213> ORGANISM: Artificial Sequence
<220> FEATURE:
<223> OTHER INFORMATION: Cap-PpLB1-B2

<400> SEQUENCE: 26

```
atgacctatc cgcgtcgtcg ttatcgtcgc cgccgtcatc gcccgcgtag tcatctgggt      60
caaatcctgc gtcgtcgccc gtggctggtg catccgcgcc accgttatcg ctggcgccgt     120
aaaaatggca ttttttaacac ccgtctgagc cgcacctttg ctataccat caaacgtacc     180
accgtgcgta ccccgagctg ggccgtggat atgatgcgtt tcaacatcaa cgattttctg     240
ccgccgggcg gcggcagcaa tccgcgctcg gtgccgttcg aatattatcg tattcgcaaa     300
gtgaaagtgg aattttggcc gtgttcgccg atcacccagg gcgatcgtgg cgtgggcagc     360
agcgccgtga ttctggatga taattttgtg accaaagcga ccgccctgac ctatgatccg     420
tatgtgaact atagctcgcg tcataccatc acccagccgt ttagctatca ctcgcgctat     480
tttaccccga aaccggtgct ggatagcacc attgattatt tcagccgaa taacaaacgt      540
aatcagctgt ggctgcgtct gcagaccgcc ggtaacgtgg atcatgtggg cctgggcacc     600
gccttcgaaa actcgatcta tgatcaggaa tataacatcc gtgtgaccat gtatgtgcag     660
tttcgcgaat taatctgaa agatccgccg ctgaatccgg gtccgggtcc gggcctggtg      720
ccgcgtggct cgggtccggg tccgggcgtg accattaaag cgaatctgat ctttgccaac     780
ggcagcaccc agaccgcgga atttaaaggc acctttgaaa aagccacctc ggaagcgtat     840
gcctatgcgg ataccctgaa gaaagataat ggcgaatata ccgtggatgt ggcggataaa     900
ggctataccc tgaacattaa attttgccggc aaagaaaaaa ccccggaaga accgaaagaa     960
gaagtgacga tcaaagcgaa tctgatctat gccgatggca aaacgcaaac ggcagagttc    1020
aaaggcacct ttgaagaagc caccgcggaa gcctatcgct atgcggatgc cctgaagaaa    1080
gataacggtg aatatacggt ggacgtggcg gacaaaggct atacgctgaa catcaaattc    1140
gcaggc                                                               1146
```

<210> SEQ ID NO 27
<211> LENGTH: 365
<212> TYPE: PRT
<213> ORGANISM: Artificial Sequence
<220> FEATURE:
<223> OTHER INFORMATION: Cap-ZZ

<400> SEQUENCE: 27

```
Met Thr Tyr Pro Arg Arg Tyr Arg Arg Arg His Arg Pro Arg
 1               5                  10                  15

Ser His Leu Gly Gln Ile Leu Arg Arg Arg Pro Trp Leu Val His Pro
             20                  25                  30

Arg His Arg Tyr Arg Trp Arg Arg Lys Asn Gly Ile Phe Asn Thr Arg
         35                  40                  45

Leu Ser Arg Thr Phe Gly Tyr Thr Ile Lys Arg Thr Thr Val Arg Thr
     50                  55                  60

Pro Ser Trp Ala Val Asp Met Met Arg Phe Asn Ile Asn Asp Phe Leu
 65                  70                  75                  80

Pro Pro Gly Gly Gly Ser Asn Pro Arg Ser Val Pro Phe Glu Tyr Tyr
                 85                  90                  95

Arg Ile Arg Lys Val Lys Val Glu Phe Trp Pro Cys Ser Pro Ile Thr
            100                 105                 110

Gln Gly Asp Arg Gly Val Gly Ser Ser Ala Val Ile Leu Asp Asp Asn
        115                 120                 125

Phe Val Thr Lys Ala Thr Ala Leu Thr Tyr Asp Pro Tyr Val Asn Tyr
    130                 135                 140
```

Ser Ser Arg His Thr Ile Thr Gln Pro Phe Ser Tyr His Ser Arg Tyr
145                 150                 155                 160

Phe Thr Pro Lys Pro Val Leu Asp Ser Thr Ile Asp Tyr Phe Gln Pro
                165                 170                 175

Asn Asn Lys Arg Asn Gln Leu Trp Leu Arg Leu Gln Thr Ala Gly Asn
            180                 185                 190

Val Asp His Val Gly Leu Gly Thr Ala Phe Glu Asn Ser Ile Tyr Asp
        195                 200                 205

Gln Glu Tyr Asn Ile Arg Val Thr Met Tyr Val Gln Phe Arg Glu Phe
    210                 215                 220

Asn Leu Lys Asp Pro Pro Leu Asn Pro Gly Pro Gly Pro Gly Leu Val
225                 230                 235                 240

Pro Arg Gly Ser Gly Pro Gly Val Asp Asn Lys Phe Asn Lys
                245                 250                 255

Glu Gln Gln Asn Ala Phe Tyr Glu Ile Leu His Leu Pro Asn Leu Asn
            260                 265                 270

Glu Glu Gln Arg Asn Ala Phe Ile Gln Ser Leu Lys Asp Asp Pro Ser
        275                 280                 285

Gln Ser Ala Asn Leu Leu Ala Glu Ala Lys Lys Leu Asn Asp Ala Gln
    290                 295                 300

Ala Pro Lys Val Asp Asn Lys Phe Asn Lys Glu Gln Gln Asn Ala Phe
305                 310                 315                 320

Tyr Glu Ile Leu His Leu Pro Asn Leu Asn Glu Glu Gln Arg Asn Ala
                325                 330                 335

Phe Ile Gln Ser Leu Lys Asp Asp Pro Ser Gln Ser Ala Asn Leu Leu
            340                 345                 350

Ala Glu Ala Lys Lys Leu Asn Asp Ala Gln Ala Pro Lys
        355                 360                 365

<210> SEQ ID NO 28
<211> LENGTH: 1095
<212> TYPE: DNA
<213> ORGANISM: Artificial Sequence
<220> FEATURE:
<223> OTHER INFORMATION: Cap-ZZ

<400> SEQUENCE: 28
atgacctatc cgcgtcgtcg ttatcgtcgt cgtcgtcatc gtcctcgcag ccatcttggt      60
caaatcctcc gtcgtcgccc gtggttggtt catcctcgcc accgttatcg gtggcgtcgg     120
aaaaatggca ttttttaacac ccggcttagc cgcacctttg ttataccat caaacgtacc     180 accgtgcgta ccccgagctg ggccgtggat atgatgcgct taatatcaa cgattttctg     240 cctccgggtg ggggcagcaa tccgcgttcg gtgccattcg aatattatcg cattcgtaaa     300
gtgaaagtgg aatttttggcc atgcagccct atcacccagg gggatcgtgg tgtggggagc     360
agcgccgtga tcctggatga taacttcgtg accaaagcga ccgcccttac ctatgatcct     420
tatgtgaact atagctcgcg tcataccatc acccagccgt ttagctatca ctcgcggtat     480
tttaccccga aacctgtgct cgatagcacc atcgattatt ccagccaaa caacaaacgc     540 aatcagcttt ggttacgtct ccagaccgcc ggtaatgtgg atcatgtggg cttgggtacc     600
gccttcgaaa actcgatcta tgatcaggaa tataacatcc gggtgaccat gtatgtgcag     660
tttcgcgaat ttaatctcaa agatccacct tgaacccag gtcctggtcc aggtttagtg     720
cctcggggga gcggtcctgg tcctggtgtg gataacaaat tcaacaaaga acagcagaac     780

```
gcgttctatg aaatcttgca tttaccaaac ctgaacgaag aacagcgcaa cgcgttttatt    840 cagtcgctca agatgatcc tagccagtcg gccaatttgt tagcggaagc caaaaaactg      900
aacgatgcgc aggccccgaa agttgacaat aaatttaata agagcagca gaacgcgttt     960 tatgaaatcc ttcacctgcc gaatttgaac gaagaacagc ggaatgcctt tattcagagc   1020
ttaaaagatg atccatctca atcggcgaac ctgctggcgg aggcgaaaaa actcaatgat   1080
gcccaagccc caaa                                                    1095
```

<210> SEQ ID NO 29
<211> LENGTH: 361
<212> TYPE: PRT
<213> ORGANISM: Artificial Sequence
<220> FEATURE:
<223> OTHER INFORMATION: Cap-ZZ

<400> SEQUENCE: 29

```
Met Thr Tyr Pro Arg Arg Tyr Arg Arg Arg His Arg Pro Arg
1               5                   10                  15

Ser His Leu Gly Gln Ile Leu Arg Arg Pro Trp Leu Val His Pro
            20                  25                  30

Arg His Arg Tyr Arg Trp Arg Lys Asn Gly Ile Phe Asn Thr Arg
        35                  40                  45

Leu Ser Arg Thr Phe Gly Tyr Thr Ile Lys Arg Thr Thr Val Arg Thr
    50                  55                  60

Pro Ser Trp Ala Val Asp Met Met Arg Phe Asn Ile Asn Asp Phe Leu
65                  70                  75                  80

Pro Pro Gly Gly Gly Ser Asn Pro Arg Ser Val Pro Phe Glu Tyr Tyr
                85                  90                  95

Arg Ile Arg Lys Val Lys Val Glu Phe Trp Pro Cys Ser Pro Ile Thr
            100                 105                 110

Gln Gly Asp Arg Gly Val Gly Ser Ser Ala Val Ile Leu Asp Asp Asn
        115                 120                 125

Phe Val Thr Lys Ala Thr Ala Leu Thr Tyr Asp Pro Tyr Val Asn Tyr
    130                 135                 140

Ser Ser Arg His Thr Ile Thr Gln Pro Phe Ser Tyr His Ser Arg Tyr
145                 150                 155                 160

Phe Thr Pro Lys Pro Val Leu Asp Ser Thr Ile Asp Tyr Phe Gln Pro
                165                 170                 175

Asn Asn Lys Arg Asn Gln Leu Trp Leu Arg Leu Gln Thr Ala Gly Asn
            180                 185                 190

Val Asp His Val Gly Leu Gly Thr Ala Phe Glu Asn Ser Ile Tyr Asp
        195                 200                 205

Gln Glu Tyr Asn Ile Arg Val Thr Met Tyr Val Gln Phe Arg Glu Phe
    210                 215                 220

Asn Leu Lys Asp Pro Pro Leu Asn Pro Gly Pro Gly Pro Gly Gly Ser
225                 230                 235                 240

Gly Pro Gly Pro Gly Val Asp Asn Lys Phe Asn Lys Glu Gln Gln Asn
                245                 250                 255

Ala Phe Tyr Glu Ile Leu His Leu Pro Asn Leu Asn Glu Glu Gln Arg
            260                 265                 270

Asn Ala Phe Ile Gln Ser Leu Lys Asp Asp Pro Ser Gln Ser Ala Asn
        275                 280                 285

Leu Leu Ala Glu Ala Lys Lys Leu Asn Asp Ala Gln Ala Pro Lys Val
    290                 295                 300
```

```
Asp Asn Lys Phe Asn Lys Glu Gln Gln Asn Ala Phe Tyr Glu Ile Leu
305                 310                 315                 320

His Leu Pro Asn Leu Asn Glu Glu Gln Arg Asn Ala Phe Ile Gln Ser
                325                 330                 335

Leu Lys Asp Asp Pro Ser Gln Ser Ala Asn Leu Leu Ala Glu Ala Lys
            340                 345                 350

Lys Leu Asn Asp Ala Gln Ala Pro Lys
        355                 360

<210> SEQ ID NO 30
<211> LENGTH: 1083
<212> TYPE: DNA
<213> ORGANISM: Artificial Sequence
<220> FEATURE:
<223> OTHER INFORMATION: Cap-ZZ

<400> SEQUENCE: 30
atgacctatc cgcgtcgccg ctatcgccgt cgccgtcacc gtccgcgttc tcacctgggc    60
caaatcctgc gtcgtcgtcc gtggctggtg catccgcgcc accgttatcg ttggcgccgt   120
aaaaatggca tttttaacac gcgtctgagt cgcacgttcg gttataccat caaacgtacc   180
accgtgcgta ccccgtcttg ggccgttgat atgatgcgtt ttaatattaa tgacttcctg   240
ccgccgggcg gtggctctaa tccgcgctcc gtgccgttcg aatattatcg tattcgcaaa   300
gtgaaagttg agttttggcc gtgcagcccg atcacccagg gtgatcgtgg tgtgggcagc   360
agcgccgtta ttctggatga caatttttgtg accaaagcga cggccctgac ctatgatccg   420
tatgttaact atagttctcg tcataccatc acgcagccgt tttcgtatca cagtcgctat   480
ttcacgccga aaccggtgct ggatagtacc attgactatt ttcagccgaa taacaaacgt   540
aatcagctgt ggctgcgtct gcaaaccgcc ggtaatgtgg atcatgttgg tctgggcacc   600
gccttcgaaa attccattta tgaccaggag tataacatcc gtgtgaccat gtatgttcaa   660
tttcgcgaat caatctgaa agatccgccg ctgaacccgg tccgggtcc gggtggctct   720 ggtccgggtc cgggtgtgga taacaaattc aacaaagaac agcaaaacgc gttctatgag   780
atcctgcatc tgccgaatct gaacgaagag cagcgtaacg catttattca aagcctgaaa   840
gatgacccgt cccagagcgc gaatctgctg gcagaagcga aaaaactgaa cgatgcccaa   900
gcaccgaaag ttgacaataa atttaacaaa gaacagcaaa atgccttcta tgagatcctg   960
cacctgccga acctgaatga agagcagcgc aatgcgttca tccagtctct gaaagacgac  1020
ccgtcgcaaa gcgcaaatct gctggcggaa gcgaaaaaac tgaatgacgc acaggcaccg  1080
aaa                                                                1083

<210> SEQ ID NO 31
<211> LENGTH: 307
<212> TYPE: PRT
<213> ORGANISM: Artificial Sequence
<220> FEATURE:
<223> OTHER INFORMATION: Cap-Z

<400> SEQUENCE: 31

Met Thr Tyr Pro Arg Arg Arg Tyr Arg Arg Arg His Arg Pro Arg
1               5                   10                  15

Ser His Leu Gly Gln Ile Leu Arg Arg Arg Pro Trp Leu Val His Pro
                20                  25                  30

Arg His Arg Tyr Arg Trp Arg Arg Lys Asn Gly Ile Phe Asn Thr Arg
            35                  40                  45
```

| | | | | | | | | | | |
|---|---|---|---|---|---|---|---|---|---|---|
|Leu|Ser|Arg|Thr|Phe|Gly|Tyr|Thr|Ile|Lys|Arg|Thr|Thr|Val|Arg|Thr|
| |50| | | |55| | | |60| | | | | | |

Pro Ser Trp Ala Val Asp Met Met Arg Phe Asn Ile Asn Asp Phe Leu
65                  70                  75                  80

Pro Pro Gly Gly Gly Ser Asn Pro Arg Ser Val Pro Phe Glu Tyr Tyr
                    85                  90                  95

Arg Ile Arg Lys Val Lys Val Glu Phe Trp Pro Cys Ser Pro Ile Thr
                100                 105                 110

Gln Gly Asp Arg Gly Val Gly Ser Ala Val Ile Leu Asp Asp Asn
            115                 120                 125

Phe Val Thr Lys Ala Thr Ala Leu Thr Tyr Asp Pro Tyr Val Asn Tyr
    130                 135                 140

Ser Ser Arg His Thr Ile Thr Gln Pro Phe Ser Tyr His Ser Arg Tyr
145                 150                 155                 160

Phe Thr Pro Lys Pro Val Leu Asp Ser Thr Ile Asp Tyr Phe Gln Pro
                165                 170                 175

Asn Asn Lys Arg Asn Gln Leu Trp Leu Arg Leu Gln Thr Ala Gly Asn
            180                 185                 190

Val Asp His Val Gly Leu Gly Thr Ala Phe Glu Asn Ser Ile Tyr Asp
            195                 200                 205

Gln Glu Tyr Asn Ile Arg Val Thr Met Tyr Val Gln Phe Arg Glu Phe
    210                 215                 220

Asn Leu Lys Asp Pro Pro Leu Asn Pro Gly Pro Gly Pro Gly Leu Val
225                 230                 235                 240

Pro Arg Gly Ser Gly Pro Gly Pro Gly Val Asp Asn Lys Phe Asn Lys
                245                 250                 255

Glu Gln Gln Asn Ala Phe Tyr Glu Ile Leu His Leu Pro Asn Leu Asn
                260                 265                 270

Glu Glu Gln Arg Asn Ala Phe Ile Gln Ser Leu Lys Asp Asp Pro Ser
            275                 280                 285

Gln Ser Ala Asn Leu Leu Ala Glu Ala Lys Lys Leu Asn Asp Ala Gln
    290                 295                 300

Ala Pro Lys
305

<210> SEQ ID NO 32
<211> LENGTH: 921
<212> TYPE: DNA
<213> ORGANISM: Artificial Sequence
<220> FEATURE:
<223> OTHER INFORMATION: Cap-Z

<400> SEQUENCE: 32

```
atgacctatc cacgtcggcg ctatcgtcgg cgccgtcatc gtcctcggag ccaccttggt    60
cagatcttac ggcgccgtcc ttggttggtg catccgcgcc accgttatcg gtggcgtcgt   120
aaaaatggca tttttaacac ccggttaagc cgcacctttg gttataccat caaacggacc   180
accgtgcgta ccccaagctg ggccgtggat atgatgcgct caacatcaa cgattttctt   240 cctcctggtg gtggtagcaa tccgcgttcg gtgccattcg aatattatcg cattcgtaaa   300
gtgaaagtgg aattttggcc atgcagccct atcacccagg gggatcgtgg tgtggggagc   360
agcgccgtga tcctggatga taacttcgtg accaaagcga ccgcccttac ctatgatccg   420
tatgtgaact atagctcgcg tcataccatc acccagccat ttagctatca ctcgcggtat   480
tttaccccga aacctgtgct tgatagcacc atcgattatt tccagccaaa caacaaacgc   540
```

-continued

```
aatcagcttt ggttacgtct ccagaccgcc ggtaatgtgg atcatgtggg cctgggtacc    600
gccttcgaaa actcgatcta tgatcaggaa tataacatcc gggtgaccat gtatgtgcag    660
tttcgcgaat taatctcaa agatccacct ttgaatcctg ggcctggtcc aggtttggtg     720
cctcggggga gcggccctgg tcctggtgtg gataacaaat tcaacaaaga acagcagaac    780
gcgttttatg aaatcttgca cttacctaat ctgaacgaag aacagcgcaa tgcgtttatt    840
cagtcgctca agatgatccc gagccagtcg gccaatttgt tagcggaagc caaaaaattg    900
aacgatgcgc aggccccgaa a                                              921
```

<210> SEQ ID NO 33
<211> LENGTH: 365
<212> TYPE: PRT
<213> ORGANISM: Artificial Sequence
<220> FEATURE:
<223> OTHER INFORMATION: ZZ-Cap

<400> SEQUENCE: 33

```
Met Val Asp Asn Lys Phe Asn Lys Glu Gln Gln Asn Ala Phe Tyr Glu
1               5                   10                  15

Ile Leu His Leu Pro Asn Leu Asn Glu Glu Gln Arg Asn Ala Phe Ile
            20                  25                  30

Gln Ser Leu Lys Asp Asp Pro Ser Gln Ser Ala Asn Leu Leu Ala Glu
        35                  40                  45

Ala Lys Lys Leu Asn Asp Ala Gln Ala Pro Lys Val Asp Asn Lys Phe
    50                  55                  60

Asn Lys Glu Gln Gln Asn Ala Phe Tyr Glu Ile Leu His Leu Pro Asn
65                  70                  75                  80

Leu Asn Glu Glu Gln Arg Asn Ala Phe Ile Gln Ser Leu Lys Asp Asp
                85                  90                  95

Pro Ser Gln Ser Ala Asn Leu Leu Ala Glu Ala Lys Lys Leu Asn Asp
            100                 105                 110

Ala Gln Ala Pro Lys Gly Pro Gly Pro Gly Leu Val Pro Arg Gly Ser
        115                 120                 125

Gly Pro Gly Pro Gly Thr Tyr Pro Arg Arg Tyr Arg Arg Arg
    130                 135                 140

His Arg Pro Arg Ser His Leu Gly Gln Ile Leu Arg Arg Arg Pro Trp
145                 150                 155                 160

Leu Val His Pro Arg His Arg Tyr Arg Trp Arg Arg Lys Asn Gly Ile
                165                 170                 175

Phe Asn Thr Arg Leu Ser Arg Thr Phe Gly Tyr Thr Ile Lys Arg Thr
            180                 185                 190

Thr Val Arg Thr Pro Ser Trp Ala Val Asp Met Met Arg Phe Asn Ile
        195                 200                 205

Asn Asp Phe Leu Pro Pro Gly Gly Gly Ser Asn Pro Arg Ser Val Pro
    210                 215                 220

Phe Glu Tyr Tyr Arg Ile Arg Lys Val Lys Val Glu Phe Trp Pro Cys
225                 230                 235                 240

Ser Pro Ile Thr Gln Gly Asp Arg Gly Val Gly Ser Ser Ala Val Ile
                245                 250                 255

Leu Asp Asp Asn Phe Val Thr Lys Ala Thr Ala Leu Thr Tyr Asp Pro
            260                 265                 270

Tyr Val Asn Tyr Ser Ser Arg His Thr Ile Thr Gln Pro Phe Ser Tyr
        275                 280                 285
```

```
His Ser Arg Tyr Phe Thr Pro Lys Pro Val Leu Asp Ser Thr Ile Asp
        290                 295                 300

Tyr Phe Gln Pro Asn Asn Lys Arg Asn Gln Leu Trp Leu Arg Leu Gln
305                 310                 315                 320

Thr Ala Gly Asn Val Asp His Val Gly Leu Gly Thr Ala Phe Glu Asn
                325                 330                 335

Ser Ile Tyr Asp Gln Glu Tyr Asn Ile Arg Val Thr Met Tyr Val Gln
                340                 345                 350

Phe Arg Glu Phe Asn Leu Lys Asp Pro Pro Leu Asn Pro
                355                 360                 365

<210> SEQ ID NO 34
<211> LENGTH: 1095
<212> TYPE: DNA
<213> ORGANISM: Artificial Sequence
<220> FEATURE:
<223> OTHER INFORMATION: ZZ-Cap

<400> SEQUENCE: 34
atggtggata caaaattcaa caaagaacag cagaacgcgt tttatgaaat cctccatttg      60
ccgaatctta cgaagaaca  gcgtaacgcg tttattcaga gcctgaaaga tgatccaagc     120
cagtcggcca atttgttagc ggaagccaaa aaactgaacg atgcgcaggc cccgaaagtt    180
gacaataaat taataaaga gcaacaaaat gcattttatg aaatcttaca ccttcctaat    240
ctcaacgaag aacagcggaa tgcgtttatt cagtcgttga agatgatcc gagccagtcg    300 gccaatcttc tggcggaagc caaaaaatta acgatgccc aggcacctaa aggtcctggt    360
ccaggccttg tgccacgcgg tagcggtcct ggtcctggta cctatcctcg tcggcgctat    420
cgtcggcgcc gtcatcgtcc tcggtcgcac ttgggtcaga tccttcggcg ccgtccatgg    480
ctggtgcatc ctcgccaccg ttatcggtgg cgtcgtaaaa atggcatttt taacacccgg    540
ctcagccgca cctttggtta taccatcaaa cggaccaccg tgcgtacccc aagctgggcc    600
gtggatatga tgcgcttcaa catcaacgat tttcttcctc tggtggtgg tagcaatcct    660 cgttcggtgc cgttcgaata ttatcgcatt cgtaaagtga agtggaatt ttggccgtgc    720 agcccaatca cccagggtga tcgtggtgtg ggcagctcgg ccgtgatttt ggatgataat    780
tttgtgacca aagcgaccgc cttaacctat gatccttatg tgaactatag ctcgcgtcat    840
accatcaccc agccttttag ctatcactcg cggtatttta ccccaaaacc tgtgttggat    900
agcaccatcg attatttcca gccaaacaac aaacgcaatc agctgtggct ccgtttgcag    960
accgcgggca acgtggatca tgtgggtctt gggaccgcct tcgaaaactc gatctatgat   1020
caggaatata caatccgggt gaccatgtat gtgcagtttc gcgaatttaa tctgaaagat   1080
ccacctctca accct                                                    1095

<210> SEQ ID NO 35
<211> LENGTH: 307
<212> TYPE: PRT
<213> ORGANISM: Artificial Sequence
<220> FEATURE:
<223> OTHER INFORMATION: Z-Cap

<400> SEQUENCE: 35

Met Val Asp Asn Lys Phe Asn Lys Glu Gln Gln Asn Ala Phe Tyr Glu
1               5                   10                  15

Ile Leu His Leu Pro Asn Leu Asn Glu Glu Gln Arg Asn Ala Phe Ile
                20                  25                  30
```

Gln Ser Leu Lys Asp Asp Pro Ser Gln Ser Ala Asn Leu Leu Ala Glu
          35                  40                  45

Ala Lys Lys Leu Asn Asp Ala Gln Ala Pro Lys Gly Pro Gly Pro Gly
 50                  55                  60

Leu Val Pro Arg Gly Ser Gly Pro Gly Pro Gly Thr Tyr Pro Arg Arg
 65                  70                  75                  80

Arg Tyr Arg Arg Arg His Arg Pro Arg Ser His Leu Gly Gln Ile
                 85                  90                  95

Leu Arg Arg Arg Pro Trp Leu Val His Pro Arg His Arg Tyr Arg Trp
                100                 105                 110

Arg Arg Lys Asn Gly Ile Phe Asn Thr Arg Leu Ser Arg Thr Phe Gly
                115                 120                 125

Tyr Thr Ile Lys Arg Thr Thr Val Arg Thr Pro Ser Trp Ala Val Asp
        130                 135                 140

Met Met Arg Phe Asn Ile Asn Asp Phe Leu Pro Pro Gly Gly Gly Ser
145                 150                 155                 160

Asn Pro Arg Ser Val Pro Phe Glu Tyr Tyr Arg Ile Arg Lys Val Lys
                165                 170                 175

Val Glu Phe Trp Pro Cys Ser Pro Ile Thr Gln Gly Asp Arg Gly Val
                180                 185                 190

Gly Ser Ser Ala Val Ile Leu Asp Asp Asn Phe Val Thr Lys Ala Thr
            195                 200                 205

Ala Leu Thr Tyr Asp Pro Tyr Val Asn Tyr Ser Ser Arg His Thr Ile
        210                 215                 220

Thr Gln Pro Phe Ser Tyr His Ser Arg Tyr Phe Thr Pro Lys Pro Val
225                 230                 235                 240

Leu Asp Ser Thr Ile Asp Tyr Phe Gln Pro Asn Asn Lys Arg Asn Gln
                245                 250                 255

Leu Trp Leu Arg Leu Gln Thr Ala Gly Asn Val Asp His Val Gly Leu
                260                 265                 270

Gly Thr Ala Phe Glu Asn Ser Ile Tyr Asp Gln Glu Tyr Asn Ile Arg
            275                 280                 285

Val Thr Met Tyr Val Gln Phe Arg Glu Phe Asn Leu Lys Asp Pro Pro
        290                 295                 300

Leu Asn Pro
305

<210> SEQ ID NO 36
<211> LENGTH: 921
<212> TYPE: DNA
<213> ORGANISM: Artificial Sequence
<220> FEATURE:
<223> OTHER INFORMATION: Z-Cap

<400> SEQUENCE: 36
atggtggata caaaattcaa caaagaacag cagaacgcgt tttatgaaat ccttcatctg      60
ccgaatctga cgaagaaca gcggaatgcg tttattcaga gcctcaaaga tgatccaagc     120
cagtcggcca atttgttagc ggaagccaaa aaattgaacg atgcccaggc acctaaaggt    180
cctggtccag gcttagtgcc acgcggtagc ggtcctggtc ctggtaccta tcctcgtcgg    240
cgctatcgtc ggcgccgtca tcgtcctcgg tcgcaccttg gtcagatcct gcggcgccgt    300
ccatggcttg tgcatcctcg ccaccgttat cggtggcgtc gtaaaaatgg cattttaac    360 acccggctga gccgcacctt tggttatacc atcaaacgga ccaccgtgcg taccccaagc    420

-continued

```
tgggccgtgg atatgatgcg cttcaacatc aacgattttc ttcctcctgg tggtggtagc      480
aatcctcgtt cggtgccgtt cgaatattat cgcattcgta aagtgaaagt ggaattttgg      540
ccgtgcagcc caatcaccca gggggatcgt ggggtgggca gcagcgccgt gatcctggat      600
gataacttcg tgaccaaagc gaccgcccct acctatgatc cttatgtgaa ctatagctcg      660
cgtcatacca tcacccagcc ttttagctat cactcgcggt attttacccc aaaacctgtg      720
ctcgatagca ccatcgatta tttccagcct aacaacaaac gcaatcagct ctggttgcgt      780
ttacagaccg cgggcaacgt ggatcacgtg ggtttgggga ccgccttcga aaactcgatc      840
tatgatcagg aatataacat ccgggtgacc atgtatgtgc agtttcgcga atttaatctc      900
aaagatccac ctttgaaccc g                                                921
```

```
<210> SEQ ID NO 37
<211> LENGTH: 30
<212> TYPE: DNA
<213> ORGANISM: Artificial Sequence
<220> FEATURE:
<223> OTHER INFORMATION: Primer

<400> SEQUENCE: 37
tatacatatg acctatccgc gtcgccgcta                                        30

<210> SEQ ID NO 38
<211> LENGTH: 30
<212> TYPE: DNA
<213> ORGANISM: Artificial Sequence
<220> FEATURE:
<223> OTHER INFORMATION: Primer

<400> SEQUENCE: 38 gtataggggga acccggaccc ggaccagagc                                       30

<210> SEQ ID NO 39
<211> LENGTH: 30
<212> TYPE: DNA
<213> ORGANISM: Artificial Sequence
<220> FEATURE:
<223> OTHER INFORMATION: Primer

<400> SEQUENCE: 39
gggtccgggt tcccctatac taggttattg                                        30

<210> SEQ ID NO 40
<211> LENGTH: 30
<212> TYPE: DNA
<213> ORGANISM: Artificial Sequence
<220> FEATURE:
<223> OTHER INFORMATION: Primer

<400> SEQUENCE: 40
agcgagctct aatccgatt ttggaggatg                                         30

<210> SEQ ID NO 41
<211> LENGTH: 699
<212> TYPE: DNA
<213> ORGANISM: Porcine circovirus 2
<220> FEATURE:
<223> OTHER INFORMATION: Cap

<400> SEQUENCE: 41
atgacctatc cgcgtcgccg ctatcgccgt cgccgtcacc gtccgcgttc tcacctgggc       60
caaatcctgc gtcgtcgtcc gtggctggtg catccgcgcc accgttatcg ttggcgccgt      120
```

-continued

```
aaaaatggca tttttaacac gcgtctgagt cgcacgttcg gttataccat caaacgtacc      180
accgtgcgta ccccgtcttg ggccgttgat atgatgcgtt ttaatattaa tgacttcctg      240
ccgccgggcg gtggctctaa tccgcgctcc gtgccgttcg aatattatcg tattcgcaaa      300
gtgaaagttg agttttggcc gtgcagcccg atcacccagg gtgatcgtgg tgtgggcagc      360
agcgccgtta ttctggatga caattttgtg accaaagcga cggccctgac ctatgatccg      420
tatgttaact atagttctcg tcataccatc acgcagccgt tttcgtatca cagtcgctat      480
ttcacgccga aaccggtgct ggatagtacc attgactatt ttcagccgaa taacaaacgt      540
aatcagctgt ggctgcgtct gcaaaccgcc ggtaatgtgg atcatgttgg tctgggcacc      600
gccttcgaaa attccattta tgaccaggag tataacatcc gtgtgaccat gtatgttcaa      660
tttcgcgaat tcaatctgaa agatccgccg ctgaacccg                             699
```

PORCINE CIRCOVIRUS TYPE 2 VLP VACCINE

TECHNICAL FIELD

The present invention relates to a fusion protein, virus-like particles (VLP) containing the fusion protein, and a vaccine containing the VLP. The present invention also relates to a method for producing the fusion protein.

BACKGROUND ART

Porcine circovirus type 2 (porcine circovirus 2 (PCV2)) induces immunodeficiency of swine infected therewith and increases susceptibility to other infectious diseases. Thus, anti-PCV2 measures are important for pig farmers. Swine infected with PCV2 develop porcine circovirus associated diseases (PCVAD). A major symptom of PCVAD is postweaning multisystemic wasting syndrome (PMWS). PMWS occurs more often in 5 to 6-week old swine and is clinically characterized by wasting, paleness of the skin, stunted growth, respiratory distress, diarrhea, and jaundice (Non-patent Literature 2). PCV2, as the causative virus of PCVAD, was first isolated from swine that developed PMWS in western Canada (Non-patent Literature 3).

PCV2 is a non-enveloped virus with a diameter of approximately 20 nm which contains single-stranded circular DNA in its genome. PCV2 has three open reading frames (ORFs: ORF1, ORF2, and ORF3) in which ORF2 encodes for a capsid protein (Cap). It is known that 60 monomers of Cap associate and form a virus-like particle as a regular icosahedral multimeric molecule (Non-patent Literature 1). Since the VLP does not contain viral genomic DNA and thus cannot proliferate, the VLP can be applied to a vaccine for preventing PCV2 infection.

As the vaccine for preventing PCV2 infection, the PCV2 inactivated vaccine "Circovac (registered trademark)" and the PCV1/PCV2 chimeric virus inactivated vaccine "Suvaxyn (registered trademark) PCV2" have been launched on the market. In addition to these inactivated vaccines, for example, the VLP vaccines "Posilis (registered trademark) PCV" (Non-patent Literature 4) and "Ingelvac CircoFLEX (registered trademark)" (Patent Literature 1), each of which contains Cap produced in a recombinant baculovirus/insect cell expression system, have been put into practical use.

Furthermore, attempts have been made to produce Cap of PCV2 using, for example, a Pichia yeast (*Pichia pastoris*), a budding yeast (*Saccharomyces cerevisiae*), and *Escherichia coli* as an expression system (Non-patent Literatures 1 and 5 to 13).

Non-patent Literature 16 has reported that antigens fused to immunoglobulin-binding domains (IBDs) were efficiently transported to lymphoid follicles and had improved immunogenicity.

Further, Non-patent Literature 17 describes a Z domain as an IBD. The Z domain is an IBD derived from *Staphylococcus aureus* protein A and has a protein three-dimensional structure, called a three-helix bundle, in which three α-helices are folded and bundled. Note that protein A is one of the virulence factors of *Staphylococcus aureus* and is a 42 kDa protein present on an outer membrane of a bacterial cell. Also, protein A has five IBDs (E, D, A, B and C domains) having high similarity in primary sequence. Note that the Z domain is an artificial sequence prepared by introducing two amino acid substitutions into the B domain.

CITATION LIST

Patent Literatures

[Patent Literature 1]
Japanese Translation of PCT International Application, *Tokuhyo*, No. 2008-526212

Non-Patent Literatures

[Non-patent Literature 1]
Khayat R. et al., J. Virol. 2011, 85, 7856-7862
[Non-patent Literature 2]
Harding J.C.S. et al., Swine Health Prod. 1997, 5, 201-203
[Non-patent Literature 3]
Ellis J. et al., Can. Vet. J. 1998, 39, 44-51
[Non-patent Literature 4]
Liu L.-J. et al., Arch. Virol. 2008, 153, 2291-2295
[Non-patent Literature 5]
Tu Y. et al., Appl. Microbiol. Biotechnol. 2013, 97, 2867-2875
[Non-patent Literature 6]
Zaveckas M. et al., J. Chromatogr. B 2015, 991, 21-28
[Non-patent Literature 7]
Marcekova Z. et al., J. Virol. Methods 2009, 162, 133-141
[Non-patent Literature 8]
Liu Q. et al., Protein Expr. Purif. 2001, 21, 115-120
[Non-patent Literature 9]
Yin S. et al., Virol. J. 2010, 7, 166
[Non-patent Literature 10]
Wu P C et al., Appl. Microbiol. Biotechnol. 2012, 95, 1501-1507
[Non-patent Literature 11]
Wu P C et al., J. Biotechnol. 2016, 220, 78-85
[Non-patent Literature 12]
Zhang Y. et al., Arch. Virol. 2016, 161, 1485-1491
[Non-patent Literature 13]
Xi X. et al., J. Biotechnol. 2016, 223, 8-12
[Non-patent Literature 14]
Wang N. et al., J. Virol. Methods 2017, 243, 146-150
[Non-patent Literature 15]
Burroughs A. M. et al., Biol. Direct 2007, 2, 18
[Non-patent Literature 16]
Miyata T. et al., Infect. Immun. 2011, 79, 4260-4275
[Non-patent Literature 17]
Bjorn N. et al., Protein Eng. 1987, 1, 107-113

SUMMARY OF INVENTION

Technical Problem

As mentioned above, some vaccines have already been launched on the market as agents for prevention of PCV2 infection, but PCV2 has a problem that PCV2-infected cultured cells are difficult to obtain a high virus titer.

Further, using the recombinant baculovirus/insect cell expression system as the expression system for producing Cap of PCV2 has problems in terms of cost and work complexity. In addition, VLP formed from Cap produced in such an expression system has a problem in terms of molecular stability against physicochemical load, and there is a problem that it is difficult to stably store the VLP for a long period of time.

Furthermore, in a case where an *Escherichia coli* expression system is used as the expression system for producing Cap of PCV2, expressed proteins become insoluble aggregates (inclusion bodies) and accumulate in the bacterial cells. Therefore, there have been no reports of VLP being spontaneously reconstituted (spontaneously associated) in the cytoplasm of *Escherichia coli* and being collected as a soluble VLP protein.

Therefore, there has been a demand for further development of PCV2 vaccines.

The present invention has been attained in view of the above-described problems, and an object of the present invention is to provide (i) PCV2 VLP that can be used as a vaccine for use in the field of animal husbandry and that has high molecular stability against physicochemical load and (ii) a technique using the PCV2 VLP.

Solution to Problem

As a result of diligent study in view of the above-described problems, the inventors of the present invention have completed the present invention after newly finding, for example, that (i) a fusion protein of PCV2 Cap and IBD (Cap-IBD fusion protein) is capable of spontaneously associating in the cytoplasm of an *Escherichia coli* expression host and forming VLP without undergoing an artificial association process in vitro, (ii) the VLP thus formed has molecular stability against physicochemical load such as heat treatment and long-term low-temperature/freezing storage, and (iii) the obtained VLP can be used as a vaccine.

That is, an aspect of the present invention relates to a fusion protein including a capsid protein of porcine circovirus type 2 and an immunoglobulin-binding domain.

Further, an aspect of the present invention relates to a method for producing a fusion protein including a capsid protein of porcine circovirus type 2 and an immunoglobulin-binding domain, the method including the steps of: preparing an expression vector containing a nucleic acid which encodes the fusion protein including the capsid protein of the porcine circovirus type 2 and the immunoglobulin binding domain; and introducing the expression vector into *Escherichia coli* to express the fusion protein.

Advantageous Effects of Invention

According to an aspect of the present invention, it is possible to provide (i) PCV2 VLP that can be used as a vaccine for use in the field of animal husbandry and that has high molecular stability against physicochemical load and (ii) a technique using the PCV2 VLP.

BRIEF DESCRIPTION OF DRAWINGS

FIG. 1 is a conceptual diagram for explaining the problems of the conventional techniques and the features of the present invention on VLP formation from PCV2 Cap.

FIG. 2 is a schematic view of a protein structure, a β-grasp fold structure, and a three-helix bundle structure of a solubilization-promoting tag (SUMO) and IBDs (SpGB, PpLB, Z).

FIG. 3 is a schematic view illustrating the arrangements of Cap and IBDs (SpGB1-B2, PpLB1-B2, ZZ) or the solubilization-promoting tag (SUMO) in the fusion proteins collected in Examples.

FIG. 4 is an electron micrograph of VLP of PCV2 Cap-SpGB1-B2.

FIG. 5 is an electron micrograph of VLP of PCV2 Cap-PpLB1-B2.

FIG. 6 is an electron micrograph of VLP of PCV2 Cap-ZZ.

FIG. 7 is an electron micrograph of VLP of PCV2 Cap-SUMO.

FIG. 8 is a chromatogram representing the analysis results obtained by gel filtration chromatography before and after heat treatment, for VLP of PCV2 Cap-ZZ.

FIG. 9 is a chromatogram representing the analysis results obtained by gel filtration chromatography before and after heat treatment, for VLP of PCV2 Cap-ZZ after subjected to dissociation of ZZ from the VLP surface layer of PCV2 Cap-ZZ.

FIG. 10 is an electron micrograph of VLP of PCV2 Cap-ZZ after stored in a PBS solution at 4° C. for 1 year.

FIG. 11 is an electron micrograph of VLP of PCV2 Cap-ZZ after stored in a PBS solution at −30° C. for 1 year.

FIG. 12 is an electron micrograph of VLP of PCV2 Cap-ZZ after stored in a PBS solution at −80° C. for 1 year.

FIG. 13 is a graph showing the results of measurement of a viral copy number in serum.

FIG. 14 is a graph showing the results of measurement of a viral copy number in lymph nodes.

DESCRIPTION OF EMBODIMENTS

Problems of the Conventional Techniques and Outline of the Present Invention As mentioned above, the conventional techniques regarding the PCV2 vaccine have various problems.

For example, as reported in Non-patent Literature 14, the problem with the use of an *Escherichia coli* expression system is that the VLPs formed from the Caps which have been produced in the *Escherichia coli* expression system are molecules which are unstable against physicochemical load. According to Non-patent Literature 14, when the VLPs from the PCV2 Caps are stored at 4° C. in a PBS solution, their particle shape cannot be maintained even for only one month, and for long-term storage, it is necessary to use a special solution in which a plurality of compounds including 15% trehalose and the like are mixed.

Further, in the *Pichia* yeast expression system described in Non-patent Literature 5, there is no evidence that VLPs were formed from the produced Caps. Further, in the budding yeast expression system described in Non-patent Literature 6, the VLPs formed from the produced Caps have distorted shapes.

Furthermore, the *Escherichia coli* expression systems described in Non-patent Literatures 1 and 7 to 13 are attractive in terms of cost and simplicity of work, but still have many issues to be faced to express structurally complex multimeric molecules like VLPs.

Specifically, most of heterologous proteins expressed in the *Escherichia coli* expression system often become insoluble aggregates (inclusion bodies) and accumulate in the bacterial cells. Since the heterologous proteins that have become inclusion bodies do not have a natural three-dimensional structure, most of them do not function as effective vaccines. A refolding method is known as a method for rewinding heterologous proteins that have become inclusion bodies into a natural three-dimensional structure. Also in some of the above-described *Escherichia coli* expression systems, solubilizing the PCV2 Cap having been collected from the inclusion bodies with a denaturing agent, such as guanidine hydrochloride, and refolding the denatured PCV2 Cap by a dialysis method or the like are attempted.

Meanwhile, as a method for expressing a heterologous protein as a soluble protein, a method of fusing a solubilization-promoting tag to a target protein is commonly used. As such a solubilization-promoting tag, for example, glutathione S-transferase (GST), maltose-binding protein (MBP), and small ubiquitin-like modifier (SUMO) having β-grasp fold structure (protein structure like a structure in which one α-helix is grasped by one β-sheet) (Non-patent Literature 15) are known. When these solubilization-promoting tags are fused mainly to an N-terminal of the target protein and expressed, the fusion protein can be collected from a soluble fraction of an *Escherichia coli* expression host. Also in some of the above-described *Escherichia coli* expression systems, fusing the solubilization-promoting tag to the N-terminal of the PCV2 Cap to collect the PCV2 Cap as a soluble protein is attempted. Unfortunately, there are many problems in forming VLPs that can function as vaccines from the collected soluble Caps.

For example, in the *Escherichia coli* expression system described in Non-patent Literature 1, complicated work processes, such as nickel affinity purification and subsequent in vitro buffer exchange, are required to form VLPs from the PCV2 Cap expressed as a soluble protein.

Further, in the *Escherichia coli* expression system described in Non-patent Literature 7, the PCV2 Cap is also expressed as a soluble protein, but even though the obtained Cap is subjected to post-treatment such as ion exchange chromatography, VLPs have not been formed.

In the *Escherichia coli* expression system described in Non-patent Literature 8, GST or MBP as the solubilization-promoting tag is fused to the N-terminal of the PCV2 Cap. However, the GST-Cap fusion protein has only been detected as a degradation product. Further, the MBP-Cap fusion protein is expressed as a soluble protein, but do not form VLPs in vitro even after undergoing a subsequent affinity purification step.

In the *Escherichia coli* expression system described in Non-patent Literature 9, SUMO as a solubilization-promoting tag is fused to an N-terminal of PCV2 Cap. As a result, a soluble SUMO-Cap fusion protein was expressed, but this fusion protein did not form VLPs by spontaneous association (self-association). Thus, formation of VLPs in vitro is attempted by cleaving and removing the SUMO tag with SUMO protease and subjecting the obtained Cap to a complicated post-treatment such as dialysis treatment. However, the formed VLPs are morphologically different from natural PCV2 particles, and have problems such as distorted particle shape and non-uniformity in particle diameter.

In the *Escherichia coli* expression systems described in Non-patent Literatures 10 and 11, formation of VLPs is attempted by using only a natural Cap sequence that does not contain any fusion tag or the like. However, the amount of VLPs obtained is extremely small, and purification treatment by, for example, a sucrose density gradient centrifugation method (Non-patent Literature 10) or a gel filtration chromatography method (Non-patent Literature 11) is required. Further, the formed VLPs have a morphological problem like the VLPs of Non-patent Literature 9.

In the *Escherichia coli* expression system described in Non-patent Literature 12, formation of VLPs from an expressed soluble Cap is attempted. However, as in the above case, various complicated work processes are required.

The *Escherichia coli* expression system described in Non-patent Literature 13 is a method limited to a specific genotype PCV2, and work processes such as buffer exchange is indispensable for promoting formation of VLPs in vitro from the expressed soluble Cap.

That is, the above-described *Escherichia coli* expression systems of Non-patent Literatures 1 and 7 to 13 attempt to reconstruct VLPs in vitro by fusion of the solubilization-promoting tags or other operations. However, in all of these expression systems, various complicated work processes such as buffer exchange are indispensable. In addition, most of the formed VLPs have problems such as distorted particle shape, non-uniformity in particle diameter, and formation of agglomerates.

In order to produce a vaccine for use in the field of animal husbandry, there has been a demand for development of an *Escherichia coli* expression system capable of producing VLPs having good morphology which is free from, for example, distorted particle shape, without the need for complicated work processes. One conceivable means for eliminating complicated work processes is to cause a soluble Cap to make spontaneous association (self-association) in the cell of the *Escherichia coli* expression host so that the *Escherichia coli* expression host spontaneously forms VLPs. This makes it possible to collect VLPs with good morphology without undergoing an artificial association process in vitro.

It has been reported that natural PCV2 VLP is such that the N-terminal of Cap is located on the luminal side of the particle, and the C-terminal thereof is located on the surface layer side thereof (Non-patent Literature 1). However, since the previously reported solubilization-promoting tag is fused to the N-terminal of Cap, there is a physical limitation for spontaneous association of Cap. Therefore, it is difficult to cause Cap to spontaneously associate in an *Escherichia coli* expression system using such a solubilization-promoting tag.

The inventors of the present invention, as a result of diligent studies to solve the above-described problems, have obtained new findings and succeeded in developing a novel PCV2 vaccine based on the new findings.

The outline of the present invention will be described with reference to FIG. 1, in comparison with the conventional techniques.

The upper and middle parts of FIG. 1 illustrate the conventional techniques on VLP formation from PCV2 Cap, and the lower part of FIG. 1 illustrates the features of the present invention on VLP formation from PCV2 Cap.

As illustrated in the upper part of FIG. 1, in a PCV2 Cap expression system using an insect cell or a mammalian cell as a host, soluble Caps are expressed, and spontaneously associate (self-associate) in the cell of the expression host to form a VLP. However, application of physicochemical load such as low-temperature long-term storage to the VLP makes the VLP unable to maintain its original particle shape and causes disintegration into Cap monomers and formation of aggregates (Cap aggregates).

Further, as illustrated in the middle part of FIG. 1, in a PCV2 Cap expression system using *Escherichia coli* as a host, even though Cap is expressed as a soluble protein, spontaneous association (self-association) itself in a cell of the host is very difficult. VLP cannot be formed without complicated work processes in vitro.

In contrast, as illustrated in the lower part of FIG. 1, in the present invention, when a Cap-IBD fusion protein was expressed in a PCV2 Cap expression system using *Escherichia coli* as a host, it was revealed that Caps spontaneously associate (self-associate) to form VLP in the cell of the expression host, as in the case of the insect cell/mammalian cell expression system. Furthermore, it was also revealed that the formed VLP had good molecular stability (for example, long-term low-temperature storage stability) against physicochemical load, unlike the VLP formed in the above-described insect cell/mammalian cell expression system. However, it was found that when the IBDs were dissociated from a surface layer of the VLP thus formed, the VLP was disintegrated by application of physicochemical load, like the VLP formed in the above-described insect cell/mammalian cell expression system. That is, it was revealed that fusing IBDs to Cap newly imparts (1) "VLP formation promoting function" and (2) "VLP disintegration suppressing function".

[Fusion Protein and Virus-Like Particle (VLP)]

A fusion protein in accordance with an embodiment of the present invention is a fusion protein including PCV2 Cap and IBD (also referred to as "Cap-IBD fusion protein").

Further, PCV2 VLP in accordance with an embodiment of the present invention is a multimeric molecule formed by association of a plurality of Cap-IBD fusion proteins.

The Cap-IBD fusion proteins can be expressed as soluble proteins in the *Escherichia coli* expression system and can spontaneously associate (self-associate) in a cell of the *Escherichia coli* expression host to spontaneously form a VLP.

As used herein, the term "VLP" refers to a particle that has a shape similar to that of a natural virus and that is a non-infectious particle. The VLP is a particle having a shape similar to that of a natural virus, as described above, and thus exhibits immunological cross-reactivity with the natural virus and functions as an effective vaccine. Since the VLP lacks a viral genome, the VLP is non-proliferative and non-infectious and is extremely safe.

As used herein, the term "Cap" means a capsid protein of PCV2.

In an embodiment of the present invention, Cap can be any of proteins indicated in (1) to (3) below or a protein that is encoded by a gene consisting of a polynucleotide indicated in (4) or (5) below:

(1) a protein consisting of the amino acid sequence represented by SEQ ID NO: 1;

(2) a protein (i) consisting of an amino acid sequence obtained by deletion, substitution, or addition of one or several amino acids in the amino acid sequence represented by SEQ ID NO: 1 and (ii) having the function of forming a VLP;

(3) a protein (i) consisting of an amino acid sequence having a sequence identity of not less than 90% with respect to the amino acid sequence represented by SEQ ID NO: 1 and (ii) having the function of forming a VLP;

(4) a polynucleotide consisting of the nucleotide sequence represented by SEQ ID NO: 2; or (5) a polynucleotide (i) being hybridizable, under a stringent condition, with a DNA consisting of a nucleotide sequence complementary to the polynucleotide consisting of the nucleotide sequence represented by SEQ ID NO: 2 and (ii) encoding a protein that has the function of forming a VLP.

With regard to whether or not PCV2 Cap is a protein having the function of forming a VLP, it is possible to determine that PCV2 Cap has the function of forming a VLP, if a VLP is formed when a fusion protein of PCV2 Cap and IBD in an embodiment of the present invention is formed and expressed in *Escherichia coli*.

The protein (3) above preferably has a higher sequence identity. The sequence identity can be, for example, not less than 91%, not less than 92%, not less than 93%, not less than 94%, not less than 95%, not less than 96%, not less than 97%, not less than 98% or not less than 99%. Note that the sequence identity of amino acid sequences can be calculated by using GENETYX Ver. 14 (product name, manufactured by Genetyx Corporation) according to a manual of the product. Note that the same applies to the identities of proteins (8), (13), and (18), which will be described later.

With regard to the term "amino acid sequence obtained by deletion, substitution, or addition of one or several amino acids" as used herein, a position where one or several amino acids are deleted, substituted or added is not particularly limited.

Further, the number of amino acids intended by the term "one or several amino acids" is not particularly limited, and can be not more than 50, not more than 40, not more than 30, not more than 20, not more than 19, not more than 18, not more than 17, not more than 16, not more than 15, not more than 14, not more than 13, not more than 12, not more than 11, not more than 10, not more than 9, not more than 8, not more than 7, not more than 6, not more than 5, not more than 4, not more than 3, not more than 2, or 1.

It is preferable that the substitution of an amino acid be a conservative substitution. Note that the term "conservative substitution" refers to a substitution of a particular amino acid by another amino acid having a chemical property and/or a structure that is/are similar to that/those of the particular amino acid. Examples of the chemical property include a degree of hydrophobicity (hydrophobicity and hydrophilicity) and electric charge (neutrality, acidity, and basicity). Examples of the structure include an aromatic ring, an aliphatic hydrocarbon group, and a carboxyl group, which are present as a side chain or as a functional group of a side chain.

Examples of the conservative substitution include a substitution between serine and threonine, a substitution between lysine and arginine, and a substitution between phenylalanine and tryptophan. As a matter of course, the substitution in an embodiment of the present invention is not limited to the above-described substitutions.

The term "stringent condition" as used herein refers to a condition under which (i) a double-stranded polynucleotide specific to a nucleotide sequence is formed, and (ii) a non-specific double-stranded polynucleotide is not formed. In other words, the stringent condition can be expressed as a condition under which hybridization is carried out at a temperature in a range from (i) a melting temperature (Tm) of nucleic acids having a high homology (e.g., a perfectly-matched hybrid) to (ii) 15° C. lower than the melting temperature (Tm), preferably 10° C. lower than the melting temperature (Tm), and further preferably 5° C. lower than the melting temperature (Tm).

In one example of the stringent condition, hybridization can be carried out in a buffer solution (consisting of 0.25M $Na_2HPO_4$, pH 7.2, 7% SDS, 1 mM EDTA, and 1×Denhardt's solution) for 16 hours to 24 hours at a temperature in a range from 60° C. to 68° C., preferably at 65° C., and further preferably at 68° C., and then washing can be carried out twice in a buffer solution (consisting of 20 mM $Na_2HPO_4$, pH 7.2, 1% SDS, and 1 mM EDTA) for 15 minutes at a temperature in a range from 60° C. to 68° C., preferably at 65° C., and further preferably at 68° C.

In another example, prehybridization is carried out overnight at 42° C. in a hybridization solution (including 25% formamide or 50% formamide (for a severer condition), 4×SSC (sodium chloride/sodium citrate), 50 mM Hepes pH 7.0, 10×Denhardt's solution, and 20 µg/ml denatured salmon sperm DNA), and then hybridization is carried out by adding a labeled probe thereto and keeping a resulting solution at 42° C. overnight. In washing following the hybridization, conditions for a washing solution and a temperature are approximately "1×SSC, 0.1% SDS, 37° C.", approximately "0.5×SSC, 0.1% SDS, 42° C." for a severer condition, approximately "0.2×SSC, 0.1% SDS, 65° C." for a further severer condition. As such, as the conditions for the washing following the hybridization become severer, the specificity of hybridization becomes higher. However, the above-indicated combinations of conditions on SSC, SDS, and temperature are merely examples. A person skilled in the art can provide a stringency similar to the above by appropriately combining the above-described or other elements (e.g., a probe concentration, a probe length, and a time period for a hybridization reaction) that determine the stringency of hybridization. This is disclosed in, for example, Sambrook et al., Molecular Cloning, A Laboratory Manual, 3rd Ed., Cold Spring Harbor Laboratory (2001).

As used herein, the term "IBD" refers to a functional unit of a polypeptide having an immunoglobulin-binding ability. The IBD suitably used in the present invention includes IBD having a β-grasp fold structure and IBD having a three-helix bundle structure.

Examples of the IBD having a β-grasp fold structure include a B domain of protein G (SpGB) and a B domain of protein L (PpLB).

Examples of SpGB include a B1 domain and a B2 domain of protein G. In an embodiment of the present invention, a domain in which a B1 domain and a B2 domain are linked can be particularly preferably used as SpGB.

In an embodiment of the present invention, SpGB can be any of proteins indicated in (6) to (8) below or a protein that is encoded by a gene consisting of a polynucleotide indicated in (9) or (10) below:

(6) a protein consisting of the amino acid sequence represented by SEQ ID NO: 3 or 5;
(7) a protein (i) consisting of an amino acid sequence obtained by deletion, substitution, or addition of one or several amino acids in the amino acid sequence represented by SEQ ID NO: 3 or 5 and (ii) having the function of forming a VLP;
(8) a protein (i) consisting of an amino acid sequence having a sequence identity of not less than 90% with respect to the amino acid sequence represented by SEQ ID NO: 3 or 5 and (ii) having the function of forming a VLP;
(9) a polynucleotide consisting of the nucleotide sequence represented by SEQ ID NO: 4 or 6; or
(10) a polynucleotide (i) being hybridizable, under a stringent condition, with a DNA consisting of a nucleotide sequence complementary to the polynucleotide consisting of the nucleotide sequence represented by SEQ ID NO: 4 or 6 and (ii) encoding a protein that has the function of forming a VLP.

With regard to whether or not SpGB is a protein having the function of forming a VLP, it is possible to determine that SpGB has the function of forming a VLP, if a VLP is formed when a fusion protein of SpGB and PCV2 Cap in an embodiment of the present invention is formed and expressed in *Escherichia coli*.

Examples of PpLB include a B1 domain and a B2 domain of protein L. In an embodiment of the present invention, a domain in which a B1 domain and a B2 domain are linked can be particularly preferably used as PpLB.

In an embodiment of the present invention, PpLB can be any of proteins indicated in (11) to (13) below or a protein that is encoded by a gene consisting of a polynucleotide indicated in (14) or (15) below:

(11) a protein consisting of the amino acid sequence represented by SEQ ID NO: 7 or 9;
(12) a protein (i) consisting of an amino acid sequence obtained by deletion, substitution, or addition of one or several amino acids in the amino acid sequence represented by SEQ ID NO: 7 or 9 and (ii) having the function of forming a VLP;
(13) a protein (i) consisting of an amino acid sequence having a sequence identity of not less than 90% with respect to the amino acid sequence represented by SEQ ID NO: 7 or 9 and (ii) having the function of forming a VLP;
(14) a polynucleotide consisting of the nucleotide sequence represented by SEQ ID NO: 8 or 10; or
(15) a polynucleotide (i) being hybridizable, under a stringent condition, with a DNA consisting of a nucleotide sequence complementary to the polynucleotide consisting of the nucleotide sequence represented by SEQ ID NO: 8 or 10 and (ii) encoding a protein that has the function of forming a VLP.

With regard to whether or not PpLB is a protein having the function of forming a VLP, it is possible to determine that PpLB has the function of forming a VLP, if a VLP is formed when a fusion protein of PpLB and PCV2 Cap in an embodiment of the present invention is formed and expressed in *Escherichia coli*.

Examples of the IBD having a three-helix bundle structure include a Z domain (Z) of protein A. Z is an artificial polypeptide, described in Non-patent Literature 17 and others, produced by introducing two amino acid substitutions into the B domain of protein A.

In an embodiment of the present invention, Z can be any of proteins indicated in (16) to (18) below or a protein that is encoded by a gene consisting of a polynucleotide indicated in (19) or (20) below:

(16) a protein consisting of the amino acid sequence represented by SEQ ID NO: 11;
(17) a protein (i) consisting of an amino acid sequence obtained by deletion, substitution, or addition of one or several amino acids in the amino acid sequence represented by SEQ ID NO: 11 and (ii) having the function of forming a VLP;
(18) a protein (i) consisting of an amino acid sequence having a sequence identity of not less than 90% with respect to the amino acid sequence represented by SEQ ID NO: 11 and (ii) having the function of forming a VLP;
(19) a polynucleotide consisting of the nucleotide sequence represented by SEQ ID NO: 12; or
(20) a polynucleotide (i) being hybridizable, under a stringent condition, with a DNA consisting of a nucleotide sequence complementary to the polynucleotide consisting of the nucleotide sequence represented by SEQ ID NO: 12 and (ii) encoding a protein that has the function of forming a VLP.

With regard to whether or not Z is a protein having the function of forming a VLP, it is possible to determine that Z has the function of forming a VLP, if a VLP is formed when a fusion protein of Z and PCV2 Cap in an embodiment of the present invention is formed and expressed in *Escherichia coli*.

In an embodiment of the present invention, an IBD fused to Cap preferably contains a domain selected from the group consisting of SpGB, PpLB, and Z, and particularly preferably contains Z.

Figure 2:
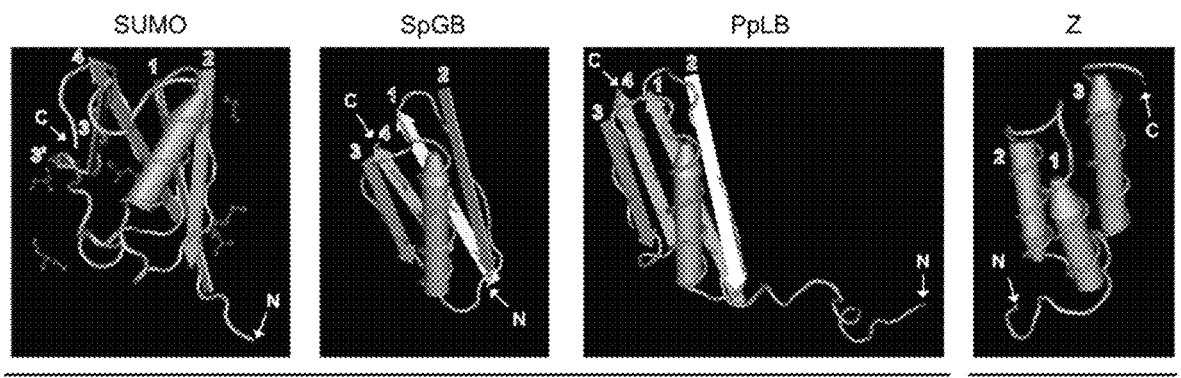
Figure 2:
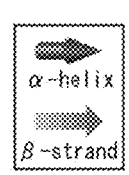
Figure 2:
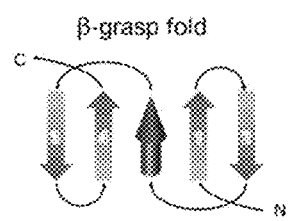
Figure 2:
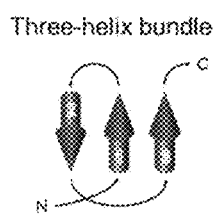

FIG. 2 illustrates a schematic view of a protein structure, a β-grasp fold structure, and a three-helix bundle structure of a solubilization-promoting tag (SUMO) and IBDs (SpGB, PpLB, Z). As illustrated in FIG. 2, SUMO (96 amino acid residues), which is a known solubilization-promoting tag, has a β-grasp fold structure, as in the case of SpGB and PpLB. SpGB, PpLB, and Z are each composed of 55 to 60 amino acid residues, and have a primary structure of about half the size of a primary structure of SUMO.

It has been revealed by the present invention that the above-described IBDs have a function of maturing Cap when fused with Cap, which is completely different function from the original antibody-binding ability. The term "maturation" of Cap as used herein means that Cap makes spontaneous association (self-association) in the cytoplasm of an *Escherichia coli* expression host to form a VLP that morphologically strongly resembles natural PCV2 particles. Such a VLP can be suitably used as a vaccine for preventing PCV2 infection. Further, by administering or inoculating the target animal with a vaccine containing the VLP, it is possible to induce immunity having high antigen specificity against infectious PCV2 and acquire the ability to induce a virus neutralizing antibody. As a result, vaccination of PCV2 VLP makes it possible to effectively suppress PCV2 infection of the target animal.

In a preferable embodiment of the present invention, the IBD constituting the Cap-IBD fusion protein has a structure in which two domains of the same type are linked. Examples of such a structure include, for example, a structure in which two SpGBs are linked (SpGB1-B2: SEQ ID NO: 13 (amino acid sequence), SEQ ID NO: 14 (nucleotide sequence)), a structure in which two PpLBs are linked (PpLB1-B2: SEQ ID NO: 15 (amino acid sequence), SEQ ID NO: 16 (nucleotide sequence)), a structure in which two Zs are linked (ZZ: SEQ ID NO: 17 (amino acid sequence), SEQ ID NO: 18 (nucleotide sequence)), and the like structure. By using SpGB1-B2, PpLB1-B2, or ZZ as the IBD constituting the Cap-IBD fusion protein, it is possible to further enhance the stability of the fusion protein as a soluble protein. This is presumed to be because that the IBD formed by linking two SpGBs, PpLBs or Zs has a molecular weight equivalent to that of the solubility-promoting tag (SUMO) and thus has acquired a solubilization promoting function comparable to that of SUMO. In a case where a plurality of domains of the same type are linked in the IBD, the number of the linked domains is not limited to two, and may be, for example, three, four, five, or more.

In an embodiment of the present invention, the IBD in the Cap-IBD fusion protein is preferably bound to a C-terminal of Cap. With the IBD bound to the C-terminal of Cap, the VLP formation promoting function and VLP disintegration suppressing function of the IBD are further improved. That is, in the cell of the *Escherichia coli* expression host, the Cap-IBD fusion protein spontaneously (self) associates and forms VLP such that the N-terminal is located on the luminal side of the particle and the C-terminal is located on the surface layer side of the particle. The formed VLP has IBDs on the surface layer thereof and has good molecular stability against physicochemical load.

In an embodiment of the present invention, the binding between Cap and the IBD, and the linkage between the domains may be made via a linker consisting of an appropriate amino acid sequence.

The linker used in an embodiment of the present invention is not particularly limited, but preferably includes any peptide consisting of 4 to 10 or more amino acid residues. Examples of such a peptide include commonly used peptides such as GPGP (4 amino acid residues, SEQ ID NO: 19), $(G_4S)_3$ (15 amino acid residues, SEQ ID NO: 20), and a combination thereof.

Alternatively, the linker may be designed to have a thrombin recognition sequence (LVPRGS) or the like inserted thereinto so that Cap and IBD can be cleaved and dissociated at a desired timing. By designing in this way, for example, it is possible to, after the Cap-IBD fusion protein forms VLP, cleave and dissociate the IBD from the surface layer of the VLP.

Further, as described in the Examples of the present specification, GPGPGLVPRGSGPGPG (SEQ ID NO: 21), GPGPGGSGPGPG (SEQ ID NO: 22) obtained by removing the thrombin recognition sequence (LVPRGS) from the sequence of GPGPGLVPRGSGPGPG (SEQ ID NO: 21), and the like can also be used as the linker.

Note that in a case where the sequence of GPGPGGSGPGPG, which excludes the above thrombin recognition sequence, is used as a linker, it is possible to produce, for example, Cap-IBD (in this case, Cap-ZZ) consisting of the amino acid sequence represented by SEQ ID NO: 29 (or Cap-IBD that is encoded by a gene consisting of a polynucleotide consisting of a nucleotide sequence represented by SEQ ID NO: 30).

[Method for Producing Cap-IBD Fusion Protein]

A method for producing PCV2 VLP in accordance with an embodiment of the present invention includes the steps of: preparing an expression vector containing a nucleic acid which encodes the above-described Cap-IBD fusion protein; and introducing the expression vector into *Escherichia coli* to express the above-described Cap-IBD fusion protein.

A nucleic acid encoding Cap and a nucleic acid encoding the IBD (e.g., SpGB, PpLB, and Z) can be prepared, based on, for example, known nucleotide sequences (SEQ ID NOs: 2, 4, 6, 8, 10, and 12) by a conventional method including, for example, PCR cloning, chemical synthesis, and the like.

Further, a nucleic acid encoding the Cap-IBD fusion protein can be prepared by a conventional method including, for example, PCR subcloning, chemical synthesis, and the like.

An expression vector for producing the Cap-IBD fusion protein can be constructed by recombinant DNA technology using a known technique, and includes: the nucleic acid encoding the Cap-IBD fusion protein; and a regulatory sequence operably linked to the nucleic acid.

A transformed cell can be produced by introducing the above-described expression vector into *Escherichia coli*, which serves as a host cell. A method for transforming *Escherichia coli* is not particularly limited, and a known method such as calcium phosphate method and an electroporation method can be used.

By culturing the prepared transformed cell under a condition that allows expression of the Cap-IBD fusion protein, the Cap-IBD fusion protein is expressed as a soluble protein. The Cap-IBD fusion protein having been expressed as a soluble protein spontaneously forms VLP by spontaneous association (self-association) in the cell of the *Escherichia coli* expression host.

[Vaccine]

A vaccine in accordance with an embodiment of the present invention contains the above-described VLP as an active ingredient. Note that the content of the active ingredient in the vaccine is not particularly limited and can be set as appropriate.

In an embodiment of the present invention, the vaccine may contain, in addition to the VLP, a pharmaceutically acceptable additive(s) including, for example, a carrier, a lubricant, a preservative, a stabilizer, a wetting agent, an emulsifier, and the like.

The form of the vaccine is not particularly limited, and examples thereof include an injection, a liquid, a suspension, an emulsion, powder, a granule, a capsule, and the like. The administration form of the vaccine is not particularly limited, and may be peroral administration or may be parenteral administration (for example, subcutaneous administration, intramuscular administration, intracutaneous administration, nasal administration, intravenous administration, intraperitoneal administration, and the like).

A target animal to which the vaccine is administered is preferably a pig, although the target animal is not particularly limited, provided that it is a non-human animal which can be infected with PCV2.

An aspect of the present invention includes the following inventions:

<1> A fusion protein comprising a capsid protein of porcine circovirus type 2 and an immunoglobulin-binding domain.

<2> The fusion protein described in <1> above, wherein the immunoglobulin-binding domain includes any one domain selected from the group consisting of a B domain of protein G, a B domain of protein L, and a Z domain of protein A.

<3> The fusion protein described in <1> or <2> above, wherein the immunoglobulin-binding domain is bound to a C-terminal of the capsid protein.

<4> The fusion protein described in any one of <1> to <3> above, wherein the immunoglobulin-binding domain has a structure in which two domains of any one type selected from the group consisting of a B domain of protein G, a B domain of protein L, and a Z domain of protein A are linked.

<5> The fusion protein described in any one of <1> to <4> above, wherein the capsid protein and the immunoglobulin-binding domain are bound via a linker.

<6> A virus-like particle formed by a fusion protein according to any one of <1> to <5> above.

<7> A vaccine comprising a virus-like particle described in <6> above.

<8> A method for producing a fusion protein comprising a capsid protein of porcine circovirus type 2 and an immunoglobulin-binding domain, the method comprising the steps of: preparing an expression vector containing a nucleic acid which encodes the above-described fusion protein comprising the capsid protein of the porcine circovirus type 2 and the immunoglobulin binding domain; and introducing the above-described expression vector into *Escherichia coli* to express the above-described fusion protein.

<9> The method described in <8> above, wherein the immunoglobulin-binding domain includes any one domain selected from the group consisting of a B domain of protein G, a B domain of protein L, and a Z domain of protein A.

<10> The method described in <8> or <9> above, wherein the immunoglobulin-binding domain is bound to a C-terminal of the capsid protein.

<11> The method described in any one of <8> to <10> above, wherein the immunoglobulin-binding domain has a structure in which two domains of any one type selected from the group consisting of a B domain of protein G, a B domain of protein L, and a Z domain of protein A are linked.

<12> The method described in any one of <8> to <11> above, wherein the capsid protein and the immunoglobulin-binding domain are bound via a linker.

The present invention is not limited to the embodiments, but can be altered by a skilled person in the art within the scope of the claims. The present invention also encompasses, in its technical scope, any embodiment derived by combining technical means disclosed in differing embodiments.

Examples

The present invention will be more specifically described below with reference to Examples. Note, however, that the present invention is not limited to those Examples.

[1. Fusion of Cap and Solubilization-Promoting Tag (GST, SUMO)]

For all gene constructs other than Cap-GST, total gene synthesis was carried out using a nucleotide sequence (codon-optimized sequence) optimized for the *Escherichia coli* expression system. Note that a method for constructing a Cap-GST fusion gene is as follows.

By PCR subcloning, a nucleic acid encoding a fusion protein (Cap-GST) in which a solubility-promoting tag (GST) was fused to a C-terminal of Cap (SEQ ID NO: 41) via a peptide linker was prepared. Specifically, with use of Cap-ZZ as a template, a Cap-linker sequence was amplified by PCR using primeSTAR (registered trademark) (manufactured by Takara Bio Inc.) and a primer set (Cap F (SEQ ID NO: 37: 5'-tatacatatgacctatccgcgtcgccgcta-3') and Cap link R (SEQ ID NO: 38: 5'-gtataggggaacccggacccggaccagagc-3')). Further, with use of pET-41a (manufactured by Merck) as a template, a GST sequence was amplified by PCR using primeSTAR (registered trademark) and a primer set (GST F (SEQ ID NO: 39: 5'-gggtccgggttcccctatactaggttattg-3') and GST R (SEQ ID NO: 40: 5'-agcgagctcttaatccgattttggaggatg-3')). Subsequently, with use of the amplified Cap-linker sequence and GST sequence as templates, a Cap-linker-GST sequence was amplified by overlap PCR using primeSTAR (registered trademark) and a primer set (Cap F and GST R). With use of a ligation product of pJexpress441-01 (manufactured by ATUM) treated with restriction enzymes NdeI (manufactured by Takara Bio Inc.) and SacI (manufactured by Takara Bio Inc.) and the Cap-linker-GST sequence treated with the same restriction enzymes, NdeI and SacI, *Escherichia coli* DH5a strain (manufactured by Takara Bio Inc.) was transformed. From the transformed *Escherichia coli* DH5a strain, pJ4-CapGST was collected by an alkaline SDS method, and *Escherichia coli* BL21 strain (manufactured by Takara Bio Inc.) was transformed.

Expression of Cap-GST was attempted by culturing the obtained transformed cells with shaking at 37° C. in an LB medium containing ampicillin (manufactured by Nacalai Tesque, Inc.) until the turbidity ($OD_{600}$) become 0.4 to 0.6, then adding isopropyl-β-thiogalactopyranoside (IPTG) (manufactured by Sigma Aldrich) to a final concentration of 1 mM, and further carrying out culturing with shaking at 37° C. for 4 hours. As a result, Cap-GST did not express solubility at all and all became inclusion bodies.

Next, expression of a fusion protein (Cap-SUMO) in which a solubilization-promoting tag (SUMO) was fused to a C-terminal side of Cap was attempted in the same manner as above. A soluble fraction obtained by disrupting the bacterial cells which had been collected by centrifugation with BugBuster (registered trademark) (manufactured by Merck) contained Cap-SUMO at a level of about 3.2 mg/L culture.

In addition, a disrupted cell suspension obtained above was analyzed by gel filtration chromatography (Sephacryl

Figure 7:
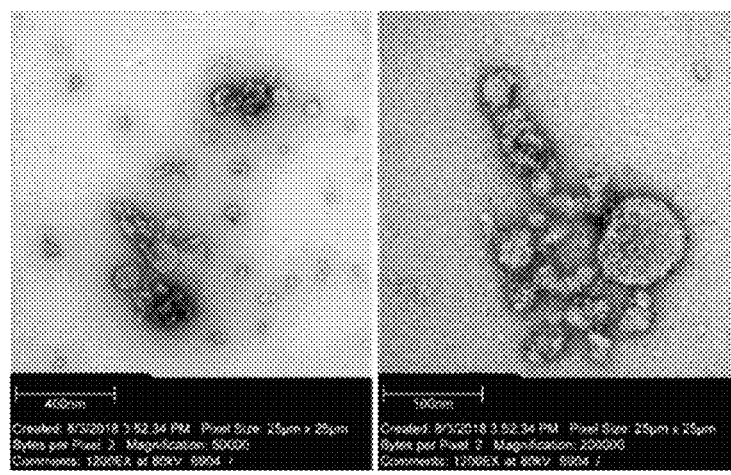

S-300, manufactured by GE Healthcare). A fraction corresponding to the expected VLP position (at about 40 mL) were collected and photographed with an electron microscope. The observed VLPs were morphologically different from natural PCV2 particles, had a distorted particle shape, and had extremely non-uniform particle diameters (FIG. 7).

Note that GST is a generally widely-used solubilization-promoting tag having a molecular weight of 25.6 kDa, and have neither a β-grasp fold structure nor a three-helix bundle structure. In contrast, SUMO is a solubilization-promoting tag having a molecular weight of 11.0 kDa, which has been used often in recent years, and has a β-grasp fold structure.

From these results, GST had neither a Cap solubilization promoting function nor a VLP formation promoting function. Therefore, it was found that Cap cannot be expressed as a soluble protein in an *Escherichia coli* expression host simply by fusing Cap and a solubilization-promoting tag. Further, unlike GST, SUMO had the Cap solubilization promoting function, but did not have the VLP formation promoting function. The reason why GST and SUMO have different effects on the solubility of Cap in spite of the fact that both GST and SUMO are the solubilization-promoting tags is considered to be that, for example, molecular weights (GST: 25.6 kDa; SUMO: 11.0 kDa) and three-dimensional structures of GST and SUMO have effects.

[2. Fusion of Cap and IBDs (SpGB1-B2, PpLB1-B2)]

On the basis of the above-described result that SUMO having a β-grasp fold structure has a Cap solubilization promoting function, examination was performed by using a B domain of protein G (SpGB) and a B domain of protein L (PpLB) as other proteins having a β-grasp fold structure, like SUMO, to determine whether they had the Cap solubilization promoting function and the VLP formation promoting function.

A nucleic acid (SEQ ID NO: 24) encoding a fusion protein (Cap-SpGB1-B2: SEQ ID NO: 23) in which an IBD having a structure in which two SpGB were linked was fused to a C-terminal of Cap via a peptide linker was prepared, and expression of Cap-SpGB1-B2 was attempted in the *Escherichia coli* BL21 (DE3) strain by the same method as in Section 1. above. A soluble fraction obtained by disrupting the bacterial cells which had been collected by centrifugation with BugBuster (registered trademark) (manufactured by Merck) contained Cap-SpGB1-B2 at a level of about 1.5 mg/L culture.

In addition, a disrupted cell suspension obtained above was analyzed by gel filtration chromatography (Sephacryl S-300, manufactured by GE Healthcare). As a result of the analysis, a peak was observed at the expected VLP position (at about 40 mL), and the corresponding fraction was collected. As a result of photographing the collected fraction with an electron microscope, an image in which VLPs were uniformly dispersed in the aqueous solution was observed (FIG. 4). The observed VLPs strongly resembled in particle shape and in particle diameter to natural PCV2 particles, and had high uniformity.

The same operation was performed on a nucleic acid (SEQ ID NO: 26) encoding a fusion protein (Cap-PpLB1-B2: SEQ ID NO: 25) in which an IBD having a structure in which two PpLBs were linked was fused. A soluble fraction of a disrupted cell suspension contained Cap-PpLB1-B2 at a level of about 1.5 mg/L culture. In addition, as a result of gel filtration chromatography analysis of the disrupted cell suspension and photographing with an electron microscope, an image in which VLPs were uniformly dispersed in the aqueous solution was observed (FIG. 5). The observed VLPs strongly resembled in particle shape and in particle diameter to natural PCV2 particles, and had high uniformity.

From these results, it was revealed that SpGB and PpLB, which has a β-grasp fold structure similarly to SUMO, has, in addition to the Cap solubilization promoting function, an excellent VLP formation promoting function, unlike SUMO.

[3. Fusion of Cap and IBD (ZZ)]

In consideration of the result, obtained in Section 2. above, that the IBDs having a β-grasp fold structure have an excellent VLP formation promoting function, examination was performed to determine whether IBDs having a structure other than the β-grasp fold structure had the Cap solubilization promoting function and the VLP formation promoting function. Specifically, examination was performed by using a Z domain (Z) of protein A having a three-helix bundle structure as the IBD, to determine whether the Z domain (Z) of protein A had the Cap solubilization promoting function and VLP formation promoting function.

A nucleic acid (SEQ ID NO: 28) encoding a fusion protein (Cap-ZZ: SEQ ID NO: 27) in which an IBD having a structure in which two Zs were linked was fused to a C-terminal of Cap via a peptide linker was prepared, and expression of Cap-ZZ was attempted in the *Escherichia coli* BL21 (DE3) strain by the same method as in Section 1. above. In a soluble fraction obtained by disrupting the bacterial cells which had been collected by centrifugation with BugBuster (registered trademark) (manufactured by Merck), Cap-ZZ was expressed at a level (6.0 mg/L culture) exceeding the levels of Cap-SpGB1-B2 and Cap-PpLB1-B2.

Figure 6:
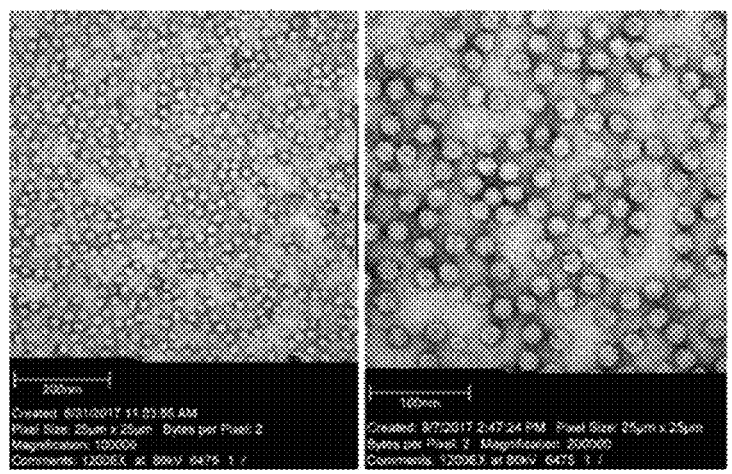

In addition, a disrupted cell suspension obtained above was subjected to gel filtration chromatography analysis, and a fraction showing a peak corresponding to VLPs was collected. As a result of photographing the collected fraction with an electron microscope, an image in which VLPs were uniformly dispersed in the aqueous solution was observed (FIG. 6).

The observed VLPs strongly resembled in particle shape and in particle diameter to natural PCV2 particles, and had high uniformity.

From these results, it was revealed that Z, which has a three-helix bundle structure, has an extremely excellent Cap solubilization promoting function and an extremely excellent VLP formation promoting function.

Note that FIG. 3 schematically illustrates Cap and IBDs (SpGB1-B2, PpLB1-B2, ZZ) or the solubilization-promoting tag (SUMO) in the fusion proteins (Cap-SUMO, Cap-SpGB1-B2, Cap-PpLB1-B2, Cap-ZZ) collected above, and the arrangements of linkers (L) that exist between Cap and the IBDs or the solubilization-promoting tag (SUMO).

[4. Examination of the Effect of the Number of IBD Fusion Molecules on Cap Solubilization and VLP Formation]

In order to examine the effect of the number of IBD fusion molecules, a nucleic acid (SEQ ID NO: 32) encoding a fusion protein (Cap-Z: SEQ ID NO: 31) in which only one Z domain (Z) molecule of protein A was fused to Cap was prepared. As a result of expressing Cap-Z using the *Escherichia coli* BL21 (DE3) strain by the same method as in Section 1. above, the expression level was about 1.3 mg/L culture. This was found to be a decrease in solubility expression level in comparison with Cap-ZZ.

From this result, it is surmised that the stability of the fusion protein as a soluble protein was enhanced by linking two molecules of Z.

[5. Examination of the Effect of IBD Fusion Position on VLP Formation]

In order to examine the effect of an IBD fusion position on VLP formation, nucleic acids (SEQ ID NOs: 34 and 36, respectively) encoding fusion proteins (ZZ-Cap: SEQ ID NO: 33, Z-Cap: SEQ ID NO: 35) in which ZZ or Z was fused to an N-terminal of Cap via a peptide linker were prepared, and expression of ZZ-Cap and Z-Cap was attempted in the *Escherichia coli* BL21 (DE3) strain by the same method as in Section 1. above.

When ZZ-Cap and Z-Cap transformed cell disrupted solutions were electrophoresed (BN-PAGE (manufactured by Invitrogen)) in a non-denatured environment, VLP bands detected for Cap-ZZ and Cap-Z were remarkably light. This is presumed to be because ZZ-Cap and Z-Cap were subjected to a physical limitation that, in order for ZZ-Cap and Z-Cap to form VLP, ZZ and Z which are located on the N-terminal side need to be included within the lumen of the VLP.

[6. High-Temperature Treatment Stability Test: Examination of the Effect of High-Temperature Treatment on Maintenance of VLP]

The VLPs of the fusion proteins (Cap-SpGB1-B2, Cap-ZZ) obtained in Section 2. and Section 3. above were subjected to a high-temperature treatment stability test by the method below to examine the effect of a high-temperature treatment on the shape of the VLPs.

A VLP aqueous solution of Cap-ZZ was heat-treated at 52° C. for 30 minutes and at 97° C. for 30 minutes, and was then analyzed by gel filtration chromatography (Sephacryl S-300, manufactured by GE Healthcare).

Figure 8:
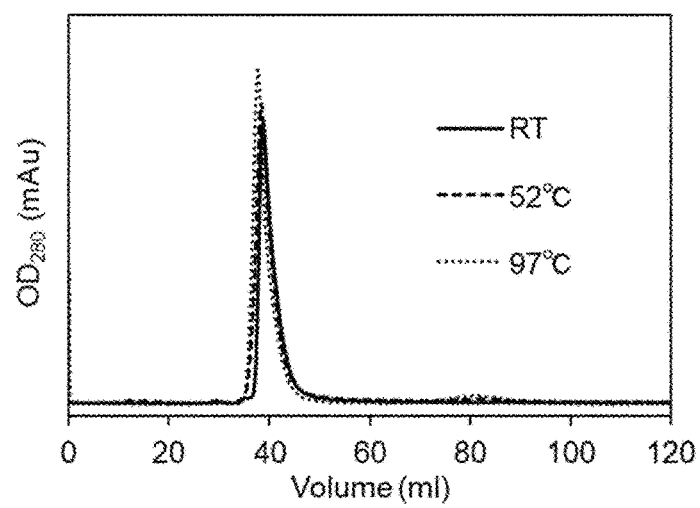

FIG. 8 shows a chromatogram representing the analysis results obtained by gel filtration chromatography before and after heat treatment, for VLP of Cap-ZZ.

As shown in FIG. 8, for the VLP of Cap-ZZ, the chromatogram did not significantly change in shape even after 30 minutes of heat-treatment at both 52° C. and 97° C. The VLP of Cap-ZZ was confirmed to have high molecular stability against high-temperature treatment. Also for VLP of Cap-SpGB1-B2, a similar result was obtained.

Next, in order to evaluate the effect of the presence of IBDs on high-temperature treatment stability of VLP, Cap-IBDs (Cap-SpGB1-B2 and Cap-ZZ) were cleaved by thrombin treatment at a site of a thrombin recognition sequence (LVPR ↓ GS (↓: thrombin-specific cleavage site)) present in the peptide linker (L) to dissociate the IBDs from the VLP.

The VLP maintained its shape even after the IBDs exposed on the VLP surface layer were cleaved and dissociated.

Figure 9:
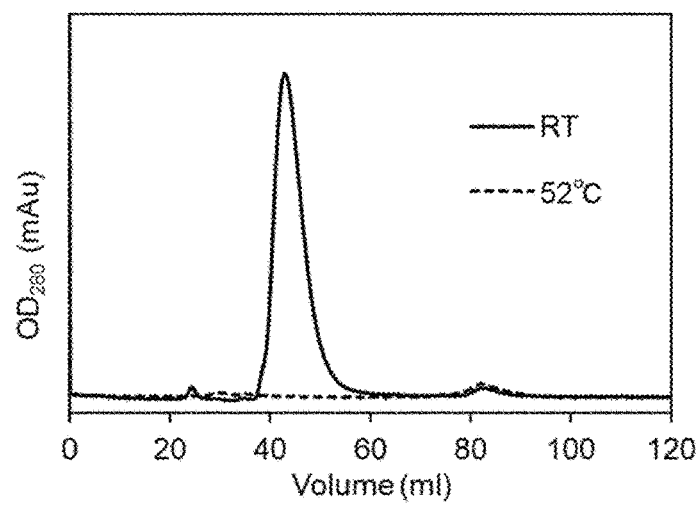

For the VLP in which IBDs were cleaved and dissociated, a high-temperature treatment stability test was conducted in the same manner as above. FIG. 9 shows a chromatogram representing the analysis results obtained by gel filtration chromatography before and after heat treatment, for VLP of Cap-ZZ after subjected to dissociation of ZZ from the VLP surface layer of Cap-ZZ.

As shown in FIG. 9, in the chromatogram after heat treatment at 52° C. for 30 minutes, a peak corresponding to the VLP completely disappeared. Therefore, it is considered that the VLP after subjected to dissociation of ZZ was disintegrated by the heat treatment. Also for VLP of Cap-SpGB1-B2 after subjected to dissociation of SpGB1-B2 from the VLP surface layer of Cap-SpGB1-B2, a similar result was obtained.

From these results, it was confirmed that the above IBDs have a VLP disintegration suppressing function that imparts molecular stability against high-temperature treatment.

[7. Low-Temperature Treatment Stability Test: Examination of the Effect of Low-Temperature Treatment on Maintenance of VLP]

The VLPs of the fusion protein (Cap-ZZ) obtained in Section 3. above were subjected to a low-temperature treatment stability test by the method below to examine the effect of a low-temperature treatment on maintenance of the shape of the VLPs.

A PBS solution in which the VLPs of Cap-ZZ were dispersed was stored for 1 year under different temperature conditions of 4° C., −30° C., and −80° C. The PBS solution after storage was returned to room temperature and was observed with an electron microscope. Electron micrographs of the VLPs of Cap-ZZ after stored at each temperature for 1 year are shown in FIG. 10 (4° C.), FIG. 11 (−30° C.), and FIG. 12 (−80° C.).

Figure 10:
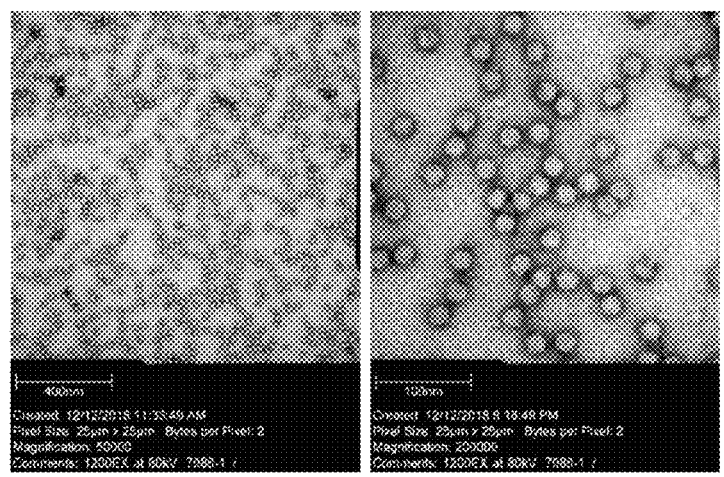
Figure 11:
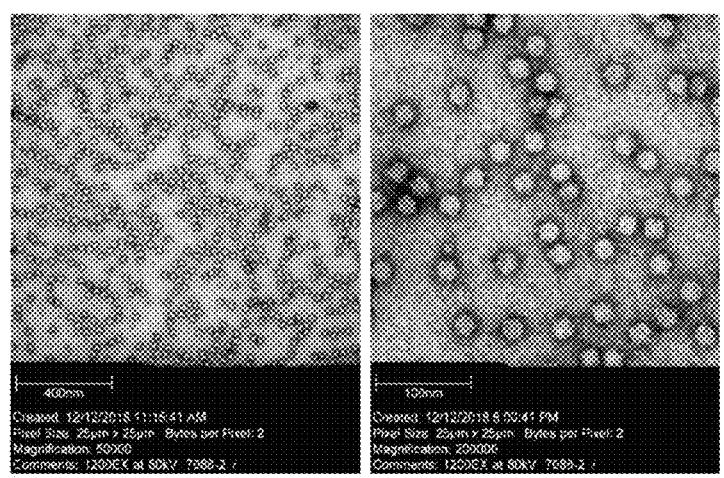
Figure 12:
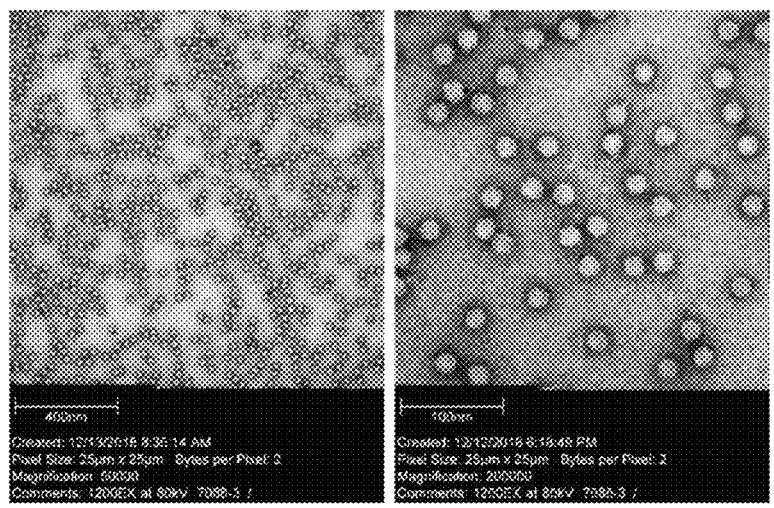

As shown in FIGS. 10 to 12, the VLPs of Cap-ZZ maintain the shape and uniformity thereof even after low-temperature storage, and the phenomenon of reduction in the number of particles due to, for example, aggregation, shape change, and disintegration of the VLPs was not observed under any of the temperature conditions.

From these results, it was confirmed that the above IBD has a VLP disintegration suppressing function that imparts molecular stability against low-temperature treatment.

[8. Vaccine Antigen Preparation, as Well as Immunity and Attack Tests on Swine]

An aqueous solution containing the VLPs of the fusion protein (Cap-ZZ) obtained in Section 3. above and an oil adjuvant were mixed to prepare a vaccine antigen. 1 mL of this vaccine antigen contains approximately 20 µg of Cap antigen.

In addition, PBS and an oil adjuvant were mixed to prepare a Mock vaccine (pseudo-control).

To 4-week-old pigs purchased from a field farm, 1 mL of Cap-ZZ vaccine antigen or Mock vaccine was administered in the cervical muscle twice at an interval of two weeks (3 to 4 pigs per group). On the second week after the second administration, attack was performed by inoculating an attack emulsion containing $10^5$ $FAID_{50}$/mL of infectious PCV2 into the nasal cavity and the buttock muscle.

Blood was collected on the 7th, 10th, and 14th days after the attack, and after serum separation, DNA of PCV2 was extracted using the QIAamp (registered trademark) DNA Blood Mini Kit (manufactured by QIAGEN). In addition, on the 14th day after the attack, autopsy was performed, and tonsils, inguinal lymph nodes, and mesenteric lymph nodes were collected to prepare a 10% emulsion, and DNA was extracted by the same method as for serum.

Using SYBR Premix Taq (manufactured by Takara Bio Inc.) and a PCV2-specific primer set (CircoDF and CircoDR), the viral copy number of PCV2 (copies/mL or copies/g) was measured by real-time PCR method (Chromo4 system manufactured by Bio-Rad).

A plasmid with a known number of copies incorporating the Cap gene was used as a standard for preparing a calibration curve. The limit of quantitation of the viral copy number of PCV2 in this real-time PCR was 2,000 copies/mL in serum and 20,000 copies/g in tissues.

Figure 13:
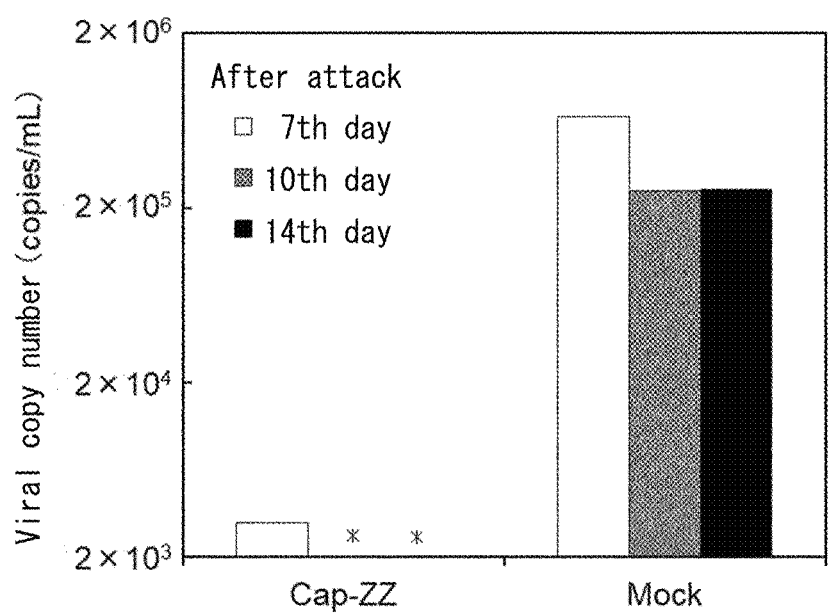
Figure 14:
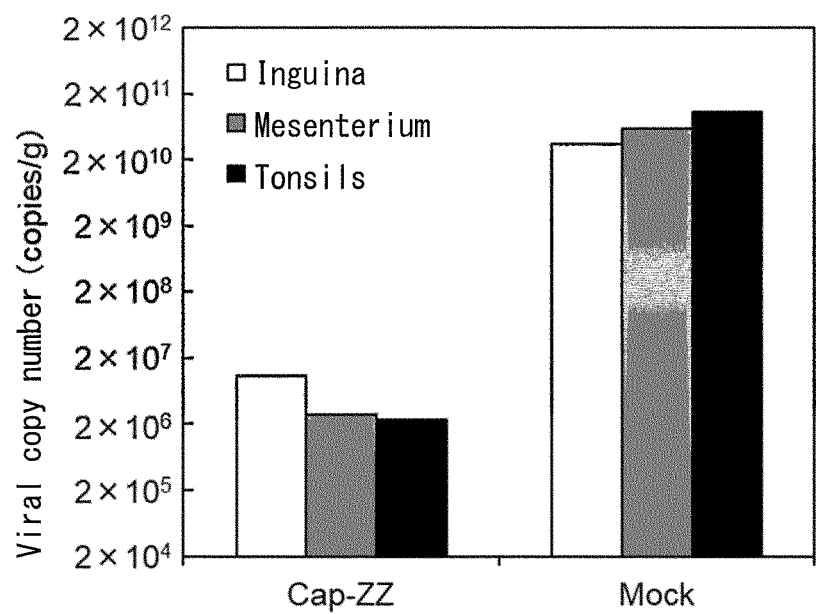

The result of measurement of the viral copy number in serum is shown in FIG. 13, and the result of measurement of the viral copy number in lymph nodes is shown in FIG. 14.

As shown in FIGS. 13 and 14, the Cap-ZZ immune group had a reduced viral copy number in serum (FIG. 13) and in each lymph node (FIG. 14) in comparison to the Mock group. This result indicates that the VLPs of the Cap-ZZ fusion protein can be used as an effective vaccine against PCV2 infection.

SUMMARY

Regarding the IBDs (SpGB, PpLB, and Z) used in the above Examples and the solubilization promoting tags (GST, SUMO), Table 1 below summarizes their known functions, three-dimensional structures, and results of tests for evaluation of various functions found by the present invention (Cap solubilization promoting function, VLP formation promoting function, VLP disintegration suppressing function (molecular stability imparting function), and vaccine function).

TABLE 1

| Fusion tag | GST | SUMO | SpGB | PpLB | Z |
|---|---|---|---|---|---|
| Function | Solubilization promotion (genetic engineering function) | | Antibody (immunoglobulin) binding (antibody-binding domains: IBDs) | | |
| Three-dimensional structure | GST fold | | β-grasp fold | | Three-helix bundle |
| Cap solubilization promoting function | No | Yes | Yes (medium) | Yes (medium) | Yes (high) |
| VLP formation promoting function (spontaneous association) | No | No | Yes | Yes | Yes |
| VLP disintegration suppressing function | / | / | | | Yes |
| (High-temperature treatment stability) | / | / | Yes | n. t. | |
| (Low-temperature treatment stability) | / | / | n. t. | n. t. | Yes |
| Vaccine function of Cap-tag fusion protein | / | / | n. t. | n. t. | Yes |

(/: not applicable (impossible to conduct); n.t.: not tested (not conducted) )

From the above results, it was found that fusing, with Cap of PCV2, IBDs, instead of GST or SUMO, which are well known as solubilization-promoting tags, makes it possible to mature such a protein as a vaccine antigen. More interestingly, it was confirmed that these IBDs have the VLP disintegration suppressing function, that is, the function of imparting molecular stability against physicochemical load.

INDUSTRIAL APPLICABILITY

The present invention is useful in the field of pharmaceuticals, particularly in the field of vaccines.

The invention claimed is:

1. A fusion protein comprising a capsid protein of porcine circovirus type 2 and an immunoglobulin-binding domain, wherein the immunoglobulin-binding domain has a structure (i) or (ii) below:
   (i) a structure in which a B1 domain and a B2 domain of protein G are linked; and
   (ii) a structure in which two of a Z domain of protein A are linked, and
   wherein the fusion protein is capable of forming a virus like particle (VLP) after a heat treatment at 97° C. for 30 minutes.

2. The fusion protein according to claim 1, wherein the immunoglobulin-binding domain is bound to a C-terminal of the capsid protein.

3. The fusion protein according to claim 1, wherein the capsid protein and the immunoglobulin-binding domain are bound via a linker.

4. A virus-like particle formed by a fusion protein according to claim 1.

5. A vaccine comprising a virus-like particle according to claim 4.

6. A method for producing a fusion protein comprising a capsid protein of porcine circovirus type 2 and an immunoglobulin-binding domain, the method comprising the steps of:
   preparing an expression vector containing a nucleic acid which encodes the fusion protein comprising the capsid protein of the porcine circovirus type 2 and the immunoglobulin binding domain; and
   introducing the expression vector into *Escherichia coli* to express the fusion protein,
   wherein the immunoglobulin-binding domain has a structure (i) or (ii) below:
   (i) a structure in which a B1 domain and a B2 domain of protein G are linked; and
   ii) a structure in which two of a Z domain of protein A are linked, and
   wherein the fusion protein is capable of forming a VLP after a heat treatment at 97° C. for 30 minutes.

7. The method according to claim 6, wherein the immunoglobulin-binding domain is bound to a C-terminal of the capsid protein.

8. The method according to claim 6, wherein the capsid protein and the immunoglobulin-binding domain are bound via a linker.

* * * * *